(12) United States Patent
Winnemoeller et al.

(10) Patent No.: US 8,787,698 B2
(45) Date of Patent: Jul. 22, 2014

(54) METHODS AND APPARATUS FOR DIRECTIONAL TEXTURE GENERATION USING IMAGE WARPING

(75) Inventors: Holger Winnemoeller, Seattle, WA (US); Simon Breslav, Farmington Hills, MI (US)

(73) Assignee: Adobe Systems Incorporated, San Jose, CA (US)

( * ) Notice: Subject to any disclaimer, the term of this patent is extended or adjusted under 35 U.S.C. 154(b) by 205 days.

(21) Appl. No.: 12/858,558

(22) Filed: Aug. 18, 2010

(65) Prior Publication Data

US 2013/0121613 A1    May 16, 2013

Related U.S. Application Data

(60) Provisional application No. 61/240,119, filed on Sep. 4, 209.

(51) Int. Cl.
| | | |
|---|---|---|
| *G06K 9/00* | (2006.01) | |
| *G06K 9/32* | (2006.01) | |
| *G06K 9/36* | (2006.01) | |
| *G09G 5/00* | (2006.01) | |
| *G06T 15/00* | (2011.01) | |
| *G06T 11/40* | (2006.01) | |
| *G06F 3/0354* | (2013.01) | |
| *G06F 3/0484* | (2013.01) | |

(52) U.S. Cl.
CPC ............ *G06T 11/40* (2013.01); *G06T 2200/24* (2013.01); *G06F 3/0354* (2013.01); *G06F 3/0484* (2013.01)
USPC ........... 382/284; 382/181; 382/293; 345/156; 345/419; 345/582; 345/629; 345/642

(58) Field of Classification Search
USPC ................. 382/100, 162, 195, 275–276, 282; 345/418–419, 473–474, 581–582, 619, 345/646–650, 660–661, 672, 676
See application file for complete search history.

(56) References Cited

U.S. PATENT DOCUMENTS

| | | |
|---|---|---|
| 4,524,454 A | 6/1985 | Ejiri |
| 4,851,984 A | 7/1989 | Doi et al. |
| 5,410,644 A | 4/1995 | Thier et al. |

(Continued)

OTHER PUBLICATIONS

Whyte, O., Sivic, J., and Zisserman, A. 2009. Get out of my picture! internet-based inpainting. In BMVC (British Machine Vision Conference), 11 pages.

(Continued)

*Primary Examiner* — Randolph I Chu
*Assistant Examiner* — Nathan Bloom
(74) *Attorney, Agent, or Firm* — Wolfe-SBMC

(57) ABSTRACT

Methods and apparatus for directional texture generation using image warping. An image warping directional texture generation method may, for example, be used to design hair or hairstyles. The method may obtain one or more user strokes via a provided brush or other user interface element to paint directional texture, such as hair, onto a target image. Primitives, such as strands, wisps, partings, etc., may be used to paint the directional texture. After the user applies a stroke to paint a primitive or a portion of a primitive onto the target image, the primitive may be automatically adjusted to fit the primitive to the stroke, handle distortion artifacts, and blend the primitive into the existing image. The user may continue to apply strokes until satisfied with the overall result.

20 Claims, 16 Drawing Sheets

(56) References Cited

U.S. PATENT DOCUMENTS

| | | | |
|---|---|---|---|
| 5,764,237 A | 6/1998 | Kaneko | |
| 5,867,166 A | 2/1999 | Myhrvold et al. | |
| 5,870,097 A | 2/1999 | Snyder et al. | |
| 5,967,050 A | 10/1999 | Seymour | |
| 5,999,194 A * | 12/1999 | Brunelle | 345/473 |
| 6,177,927 B1 | 1/2001 | Chery et al. | |
| 6,262,745 B1 | 7/2001 | Perani | |
| 6,272,178 B1 | 8/2001 | Nieweglowski et al. | |
| 6,314,209 B1 | 11/2001 | Kweon et al. | |
| 6,348,924 B1 * | 2/2002 | Brinsmead | 345/441 |
| 6,400,362 B1 | 6/2002 | Uchiyama et al. | |
| 6,453,069 B1 | 9/2002 | Matsugu et al. | |
| 6,597,818 B2 | 7/2003 | Kumar et al. | |
| 6,636,644 B1 | 10/2003 | Itokawa | |
| 6,687,411 B1 | 2/2004 | Miura et al. | |
| 6,721,444 B1 | 4/2004 | Gu et al. | |
| 6,760,483 B1 | 7/2004 | Elichai et al. | |
| 6,762,769 B2 | 7/2004 | Guo et al. | |
| 6,919,903 B2 | 7/2005 | Freeman et al. | |
| 6,920,610 B1 | 7/2005 | Lawton et al. | |
| 6,931,600 B1 | 8/2005 | Pittman | |
| 6,937,275 B2 | 8/2005 | Heiles | |
| 6,964,025 B2 | 11/2005 | Angiulo et al. | |
| 6,987,535 B1 | 1/2006 | Matsugu et al. | |
| 7,012,624 B2 | 3/2006 | Zhu et al. | |
| 7,034,848 B2 | 4/2006 | Sobol | |
| 7,069,506 B2 | 6/2006 | Rosenholtz et al. | |
| 7,136,072 B2 | 11/2006 | Ritter | |
| 7,176,908 B2 | 2/2007 | Matsubara et al. | |
| 7,206,532 B2 | 4/2007 | Lofthus et al. | |
| 7,239,314 B2 | 7/2007 | Johnston | |
| 7,257,261 B2 | 8/2007 | Suh | |
| 7,283,140 B2 * | 10/2007 | Zhou et al. | 345/582 |
| 7,342,586 B2 * | 3/2008 | Jaeger | 345/473 |
| 7,418,673 B2 | 8/2008 | Oh | |
| 7,479,963 B2 * | 1/2009 | Lischinski et al. | 345/474 |
| 7,551,780 B2 | 6/2009 | Nudd et al. | |
| 7,576,756 B1 | 8/2009 | Good et al. | |
| 7,577,313 B1 | 8/2009 | Georgiev | |
| 7,596,751 B2 | 9/2009 | Rowson et al. | |
| 7,639,268 B2 | 12/2009 | Tsunoda | |
| 7,737,977 B2 * | 6/2010 | Grassia et al. | 345/473 |
| 7,831,098 B2 | 11/2010 | Melikian | |
| 8,179,384 B2 | 5/2012 | Sakashita et al. | |
| 8,249,365 B1 | 8/2012 | Winnemoeller et al. | |
| 8,280,703 B1 | 10/2012 | Mech | |
| 8,340,463 B1 | 12/2012 | Cho et al. | |
| 8,532,387 B2 | 9/2013 | Winnemoeller et al. | |
| 8,599,219 B2 | 12/2013 | Shechtman et al. | |
| 8,619,098 B2 | 12/2013 | Shechtman et al. | |
| 2001/0038718 A1 | 11/2001 | Kumar et al. | |
| 2003/0090487 A1 * | 5/2003 | Dawson-Scully | 345/473 |
| 2004/0114814 A1 | 6/2004 | Boliek et al. | |
| 2004/0155879 A1 | 8/2004 | Mittring | |
| 2004/0189618 A1 | 9/2004 | Perry et al. | |
| 2005/0188304 A1 | 8/2005 | Lawton et al. | |
| 2005/0243089 A1 | 11/2005 | Johnston | |
| 2006/0026524 A1 | 2/2006 | Ma et al. | |
| 2006/0072847 A1 | 4/2006 | Chor et al. | |
| 2006/0085743 A1 | 4/2006 | Baudisch et al. | |
| 2006/0267958 A1 | 11/2006 | Kolmykov-Zotov et al. | |
| 2007/0047008 A1 | 3/2007 | Graham et al. | |
| 2007/0047012 A1 | 3/2007 | Bryant | |
| 2007/0098266 A1 | 5/2007 | Chiu et al. | |
| 2007/0165904 A1 | 7/2007 | Nudd et al. | |
| 2007/0216701 A1 * | 9/2007 | Bruderlin et al. | 345/581 |
| 2008/0085044 A1 | 4/2008 | Zhou et al. | |
| 2008/0086688 A1 | 4/2008 | Chandratillake et al. | |
| 2008/0117214 A1 | 5/2008 | Perani et al. | |
| 2008/0152201 A1 | 6/2008 | Zhang et al. | |
| 2008/0235207 A1 | 9/2008 | Berkner et al. | |
| 2008/0235585 A1 | 9/2008 | Hart et al. | |
| 2008/0238942 A1 | 10/2008 | Sun et al. | |
| 2008/0309662 A1 | 12/2008 | Hassner et al. | |
| 2009/0208118 A1 | 8/2009 | Csurka | |
| 2009/0276408 A1 | 11/2009 | Auerbach et al. | |
| 2010/0066874 A1 | 3/2010 | Ishiga | |
| 2010/0086220 A1 | 4/2010 | Minear | |
| 2010/0092093 A1 | 4/2010 | Akatsuka et al. | |
| 2010/0110068 A1 | 5/2010 | Yamauchi et al. | |
| 2010/0177955 A1 | 7/2010 | Simakov et al. | |
| 2010/0201803 A1 | 8/2010 | Melikian | |
| 2010/0226564 A1 | 9/2010 | Marchesotti et al. | |
| 2010/0251121 A1 | 9/2010 | Rosser et al. | |
| 2011/0016112 A1 | 1/2011 | Yu | |
| 2011/0064388 A1 * | 3/2011 | Brown et al. | 386/285 |
| 2011/0066706 A1 | 3/2011 | Ostrover et al. | |
| 2011/0082728 A1 | 4/2011 | Melikian | |
| 2012/0133817 A1 | 5/2012 | Anderson | |
| 2013/0051685 A1 | 2/2013 | Shechtman et al. | |
| 2013/0120438 A1 | 5/2013 | Shechtman et al. | |
| 2013/0120454 A1 | 5/2013 | Shechtman et al. | |
| 2013/0121608 A1 | 5/2013 | Winnemoeller et al. | |

OTHER PUBLICATIONS

U.S. Appl. No. 12/868,519, filed Aug. 25, 2010, Elya Shechtman, et al.

U.S. Appl. No. 12/857,294, filed Aug. 16, 2010, Dan Goldman, et al.

P. Bhat, B. Curless, M. Cohen, and C. L. Zitnick. Fourier analysis of the 2d screened poisson equation for gradient domain problems. In ECCV, 2008, 14 pages.

U.S. Appl. No. 12/394,280, filed Feb. 27, 2009, Dan Goldman, et al.

Yonatan Wexler, Eli Shechtman, Michal Irani. Space-Time Completion of Video. IEEE Transactions on Pattern Analysis and Machine Intelligence, vol. 29, No. 3, Mar. 2007,14 pages.

Agarwala, A., Dontcheva, M., Agrawala, M., Drucker, S., Colburn, A., Curless, B., Salesin, D., and Cohen, M. 2004. Interactive digital photomontage. In ACM SIGGRAPH, vol. 23, 294-302.

Arias, P., Facciolo, G., Caselles, V., and Sapiro, G. 2011. A variational framework for exemplar-based image inpainting. IJCV 93 (July), 319-347.

U.S. Appl. No. 12/315,038, filed Nov. 26,2008, Dan Goldman, et al.

Burt, P. J., and Adelson, E. H. 1983. A multiresolution spline with application to image mosaics. ACM Trans. Graphics 2 (October), 217-236.

Efros, A. A., and Leung, T. K. 1999. Texture synthesis by non-parametric sampling. IEEE Computer Society, Los Alamitos, CA, USA, 6 pages.

Fang, H., and Hart, J. C. 2007. Detail preserving shape deformation in image editing. In ACM SIGGRAPH, vol. 26, pp. 1-5.

Hays, J., and Efros, A. A. 2007. Scene completion using millions of photographs. In ACM SIGGRAPH, vol. 26, 4:1-4: 7 pages.

Kwatra, V., Essa, I., Bobick, A., and Kwatra, N. 2005. Texture optimization for example-based synthesis. In ACM SIGGRAPH, vol. 24, 795-802.

Kwatra, V., Schödl, A., Essa, I., Turk, G., and Bobick, A. 2003. Graphcut textures: image and video synthesis using graph cuts. In ACM SIGGRAPH, vol. 22, 277-286.

Perez, P., Gangnet, M., and Blake, A. 2003. Poisson image editing. In ACM SIGGRAPH, vol. 22, 313-318.

Rother, C., Bordeaux, L., Hamadi, Y., and Blake, A. 2006. AutoCollage. In ACM SIGGRAPH, vol. 25, 847-852.

Simakov, D., Caspi, Y., Shechtman, E., and Irani, M. 2008. Summarizing visual data using bidirectional similarity. In CVPR, 8 pages.

Szeliski, R., and Shum, H.-Y. 1997. Creating full view panoramic image mosaics and environment maps. In ACM SIGGRAPH, 251-258.

Tappen, M., Freeman, W., and Adelson, E. 2005. Recovering intrinsic images from a single image. IEEE Trans. PAMI 27, 9 (sept.), 1459-1472.

Wei, L. Y., and Levoy, M. 2000. Fast texture synthesis using tree-structured vector quantization. In ACM SIGGRAPH, 479-488.

U.S. Appl. No. 12/868,540, filed Aug. 25, 2010, Elya Shechtman, et al.

U.S. Appl. No. 13/565,552, filed Aug. 2, 2012, Elya Shechtman, et al.

Kajiya, J. T. and Kay, T. L. 1989. Rendering fur with three dimensional textures. SIGGRAPH Comput. Graph. 23, 3 (Jul. 1989), 271-280.

(56) References Cited

OTHER PUBLICATIONS

Marschner, S. R., Jensen, H. W., Cammarano, M., Worley, S., and Hanrahan, P. 2003. Light scattering from human hair fibers. In ACM SIGGRAPH 2003 Papers (San Diego, California, Jul. 27-31, 2003). SIGGRAPH '03. ACM, New York, NY, 780-791.
Barnes, C., Shechtman, E., Finkelstein, A., and Goldman, D. B. 2009. PatchMatch: a randomized correspondence algorithm for structural image editing. In ACM SIGGRAPH 2009 Papers (New Orleans, Louisiana, Aug. 3-7, 2009). H. Hoppe, Ed. SIGGRAPH '09. ACM, New York, NY, 1-11.
Chen, H. and Zhu, S. 2006. A Generative Sketch Model for Human Hair Analysis and Synthesis. IEEE Trans. Pattern Anal. Mach. Intell. 28, 7 (Jul. 2006), 1025-1040.
H. Chen and S. C. Zhu, "A generative model of human hair for hair sketching", CVPR (IEEE Conference on Computer Vision and Pattern Recognition), 2:74-81, 2005.
David J. Heeger and James R. Bergen. Pyramid-based texture analysis/synthesis. In SIGGRAPH 95, pp. 229-238, 1995.
U.S. Appl. No. 12/858,546, filed Aug. 18, 2010.
U.S. Appl. No. 12/858,552, filed Aug. 18, 2010.
Marketwire.com release, "Auryn Releases "Auryn Ink" Watercolor App; Named One of the Seven Most Innovative iPad Apps of 2010 by fast Company," Jan. 4, 2011, pp. 1-2.
giggleapps.com review, "Auryn Ink Review," Feb. 10, 2011, pp. 1-4.
iTunes Preview, "Auryn Inc. Auryn ink," Jul. 20, 2011, downloaded at http://itunes.apple.com/us/app/auryn-Auryn\%20Ink/id407668628, pp. 1-2.
U.S. Appl. No. 131219,453, filed Aug. 26 2011, Diverdi Et al.
Barla P., Breslav S., Thollot J., Sillion F., Markosian L.; Stroke Pattern Analysis and Synthesis. Computer Graphics Forum, 25 (3), pp. 663-671, 2006.
Muller M., Heidelberger B., Teschner M., Gross M.: Meshless deformations based on shape matching. ACM Transactions on Computer Graphics, 24, 3 (2005), pp. 471-478.
Mech R., Prusinkiewicz P.; Visual models of plants interacting with their environment. In Proceedings of ACM SIGGRH 1996, pp. 397-410.
Prusinkiewicz P., James M., Mech R.; Synthetic topiary. In Proceedings of ACM SIGGRAPH 1994, pp. 351-358.
Wong M. T., Zongker D. E., Salesin D. H.; Computer-generated floral ornament. In Proceedings of SIGGRAPH 1998, pp. 423-434.
Parish Y. I. H., Muller P.; Procedural modeling of cities. In Proceedings of ACM SIGGRAPH 2001, pp. 301-308.
Wonka P., Wmmer M., Sillion F., Ribarsky W.; Instant architecture. ACM Trans. Graph.,22 (2003), 3, pp. 669-677.
Muller P., Wonka P., Haegler S., Ulmer A., Gool L.V.: Procedural modeling of buildings. ACM TRANS. Graph., 25(2006) 3, pp. 614-623.
Deussen O. and Lintermann, B.: Interactive Modeling of Plants. IEEE Computer Graphics and Applications, 19 (1999), 1, pp. 56-65.
Esch G., Wonka P., Muller P., Zhang E.: Interactive procedural street modeling, SIGGRAPH 2007 Sketches.
Ijiri T., Owada S., Igarashi T.: The sketch L-System: global control of tree modeling using free-form strokes. In Proceedings of 6th International Symposium SmartGraphics 2006, pp. 138-146.
Heeger. D. J., Bergen, J. R: Pyramid-based texture analysis and synthesis. In Proceedings of SIGGRAPH 1995, pp. 229-238.
Efros A. A., Leung T.K.: Texture synthesis by nonparametric sampling. In IEEE Int. Conf. on Computer Vision (1999), pp. 1033-1038.
Wei L. Y., Levoy M.: Fast Texture Synthesis using Tree-structured Vector Quantization. In Proceedings of SIGGRAPH 2000, pp. 479-488.
Turk G.: Texture Synthesis on Surfaces. In Proceedings of SIGGRAPH 2001, pp. 347-354.
Ashikhmin, M.: Synthesizing Natural Textures. In Proceedings of the Symposium on Interactive 3D Graphics 2001, pp. 217-226.
Hertzmann, A., Jacobs, C.E. Oliver, N., Curless, B., Salesin, D.H.: Image Analogies. In Proceedings of SIGGRAPH 2001, pp. 327-340.

Kwatra, V., Schodl, A., Essa, I., Turk, G., Bobick, A.: Graphcut textures: Image and video synthesis using graph cuts. ACM Trans. Graph. 22 (2003), 2, pp. 277-286.
Deussen O., Hiller S., Van Overveld C., Strothotte T.: Floating points: A method for computing stipple drawings. Computer Graphics Forum 19, pp. 1-3 (2000).
Winkenbach G., Salesin D. H.: Computer generated pen-and-ink illustration. In Proceedings of SIGGRAPH 1994, pp. 91-100.
Salisbury M. P., Anderson S. E., Barzel R., Salesin D.H.: Interactive pen-and-ink illustration, In Proceedings of SIGGRAPH 1994, p. 101.
Hertzmann A., Oliver N., Curless B., Seitz S.M.: Curve analogies. In Rendering Techniques 2002: 13th Eurographics Workshop on Rendering, pp. 233-246.
Jodoin P. M., Epstein E., Granger-Piche M., Ostromoukhov V.: Hatching by example: a statistical approach. In Proceedings of NPAR 2002, pp. 29-36.
Lloyd S. P.: Least Squares quantization in pcm. IEEE Trans. on Information Theory 28, 2 (1982), pp. 129-137.
U.S. Appl. No. 12/039,164, filed Feb. 28, 2008, Radomir Mech.
U.S. Appl. No. 12/858,558, filed Aug. 18, 2010, Holger Winnemoeller.
U.S. Appl. No. 13/219,457, filed Aug. 26, 2011, Stephen J Diverdi.
U.S. Appl. No. 13/029,036, filed Feb. 16, 2011, Radomir Mech.
U.S. Appl. No. 12/857,382, filed Aug. 16, 2010, Mech Et al.
Sims, K. Artificial Evolution for Computer Graphics. Computer Graphics 25, 4 (Aug. 1991), pp. 319-328.
J. Marks, B. Andalman, P.A. Beardsley, and H. Pfister et al. Design Galleries: A General Approach to Setting Parameters for Computer Graphics and Animation. In ACM Computer Graphics (SIGGRAPH '97 Proceedings), pp. 389-400, Aug. 1997.
Igarashi, T. and J.F. Hughes, A Suggestive Interface for 3D Drawing, in Proceedings of the ACM Symposium on User Interface Software and Technology, UIST 01. 2001, ACM: Orlando, Florida. pp. 1-9.
L. Shapira, A. Shamir, and D. Cohen-Or. Image appearance exploration by model based navigation. In Computer Graphics Forum, Eurographics, 2009. (Mar. 30 to Apr. 3, 2009) pp. 1-10.
Jonathan Duran, Deco tool and Spray Brush for creating complex, geometric patterns in Flash http://www.adobe.com/devnet/flash/articles/deco_intro.html Feb. 2, 2009, pp. 1-19.
U.S. Appl. No. 13/029,036, filed Feb. 16, 2011, Adobe Systems Incorporated, all pages.
U.S. Appl. No. 13/219,848, filed Aug. 26, 2011, Adobe Systems Incorporated, all pages.
O. Deussen et al., "The Elements of Nature: Interactive and Realistic Techniques," ACM SIGGRAPH 2004 Course Note #31, Aug. 2004, pp. 1-64.
Ando, R., & Tsuruno, R. (2010). Vector fluid: A vector graphics depiction of surface flow. In NPAR '10: Proceedings of the 8th International Symposium on Non-photorealistic Animation and Rendering (pp. 129-135). New York, NY, USA: ACM, pp. 1-7.
Ando, R., & Tsuruno, R., Vector graphics depicting marbling flow. In Computers & Graphics, vol. 35, Issue 1, Feb. 2011, pp. 148-159.
Siu Hang Chu, "Making Digital Painting Organic," PhD thesis, Hong Kong University of Science and Technology, Aug. 2007, pp. 1-126.
Tom Van Laerhoven, "An Extensible Simulation Framework Supporting Physically-based Interactive Painting," PhD thesis, University of Limburg, Jun. 21, 2006, pp. 1-171.
Corel, "Corel Painter 11 Features," from the WayBackmachine, May, 26, 2011, pp. 1-3.
Corel, "Corel Painter 11 Overview," from the WayBackMachine, May 26, 2010, pp. 1-3.
Ambient Design, "Artrage 3," http://www.ambientdesign.com/, from web.archive.org, May 25, 2010, ArtRage home page, page 1.
Prusinkiewicz, Przemyslaw; Lindenmayer, Aristid (1990). The Algorithmic Beauty of Plants. Springer-Verlag. Chapter 4, pp. 101-107. ISBN 978-0387972978.
Chen, X., Neubert, B., Xu, Y.-Q., Deussen, O., and Kang, S. B. 2008. Sketch-based tree modeling using markov random field. ACM Trans. on Graphics 27, 5, pp. 1-9.
"Corrected Notice of Allowance", U.S. Appl. No. 12/858,546, filed Jun. 6, 2013,8 pages.
"Notice of Allowance", U.S. Appl. No. 12/868,519, filed Jun. 17, 2013, 10 pages.

(56) References Cited

OTHER PUBLICATIONS

"Notice of Allowance", U.S. Appl. No. 12/868,540, filed Jul. 22, 2013, 10 pages.

"Non-Final Office Action", U.S. Appl. No. 12/858,546, filed Jan. 30, 2013, 19 pages.

"Non-Final Office Action", U.S. Appl. No. 12/868,519, filed Feb. 7, 2013, 16 pages.

"Non-Final Office Action", U.S. Appl. No. 12/868,540, filed Feb. 22, 2013, 12 pages.

"Notice of Allowance", U.S. Appl. No. 12/858,546, filed May 6, 2013, 12 pages.

"Notice of Allowance", U.S. Appl. No. 12/858,552, filed Apr. 20, 2012, 8 pages.

Barnes, Connelly et al., "The Generalized PatchMatch Correspondence Algorithm", retrieved from <http://www.cs.princeton.edu/gfx/pubs/Barnes_2010_TGP/index.php> on Sep. 9, 2010, 14 pages.

Bhat, Pravin et al., "GradientShop: A Gradient-Domain Optimization Framework for Image and Video Filtering", *ACM Transactions on Graphics* 29(2), (2010), 15 pages, Mar. 2010.

Bugeau, Aurelie et al., "A Comprehensive Framework for Image Inpainting", *IEEE Transactions on Image Processing*, vol. 19, No. 10, (Oct. 2010), pp. 2634-2645.

Hacohen, Yoav et al., "Non-Rigid Dense Correspondence with Applications for Image Enhancement", *SIGGRAPH*, (2011), 9 pages.

Kaneva, Biliana et al., "Infinite Images: Creating and Exploring a Large Photorealistic Virtual Space", *Proceeding of the IEEE*, vol. 98, No. 8, (Aug. 2010), 17 pages.

Lee, Hyunjoon et al., "Automatic Upright Adjustment of Photographs", *CVPR*, (2012), 11 pages.

Lin, Wen-Yan et al., "Smoothly Varying Affine Stitching", *Proceedings of Computer Vision and Pattern Recognition (CVPR)*, (Jun. 2011), 13 pages.

Mansfield, Alex et al., "Transforming Image Completion", *Proceedings of British Machine Vision Conference (BMVC)*, (Aug. 29, 2011), 11 pages.

McVeigh, Chris "ArtRage Studio Pro 3", *PCWorld*, retrieved from <http://www.pcworld.com/businesscenter/article/189221/artage_studio_pro_3.html> on Aug. 23, 2011, 4 pages.

Pritch, Yael et al., "Shift-Map Image Editing", *ICCV '09, Kyoto, Japan*, (Sep. 2009), 8 pages.

Ruiters, Roland et al., "Patch-Based Texture Interpolation", *Eurographics Symposium on Rendering*, vol. 29, No. 4, (2010), 9 pages, Aug. 2010.

Shechtman, Eli et al., "Regenerative Morphing", *CVPR* (2010), 8 pages, Jun. 2010.

Suh, et al., "Automatic Thumbnail Cropping and its Effectivenenss", *UIST '03: Proceedings of the 16th annual ACM symposium on User interface software and technology*, ACM Press, New York, NY, USA (Nov. 2003), pp. 95-104.

Sunkavalli, Kalyan et al., "Multi-Scale Image Harmonization", *ACM SIGGRAPH*, vol. 29, (2010), 10 pages, Jul. 2010.

Wang, et al., "MobiPicture—Browsing Pictures on Mobile Devices", *Proceedings of the eleventh ACM internatioanl conference on Multimedia*, (Nov. 2, 2003), pp. 106-107.

"Non-Final Office Action", U.S. Appl. No. 13/565,552, Mar. 27, 2014, 10 pages.

"Notice of Allowance", U.S. Appl. No. 13/565,552, Jun. 5, 2014, 7 pages.

\* cited by examiner

METHODS AND APPARATUS FOR DIRECTIONAL TEXTURE GENERATION USING IMAGE WARPING

PRIORITY INFORMATION

This application claims benefit of priority of U.S. Provisional Application Ser. No. 61/240,119 entitled "Methods and Apparatus for Image-Based Directional Texture Generation" filed Sep. 4, 2009, the content of which is incorporated by reference herein in its entirety.

BACKGROUND

Description of the Related Art

While many conventional tools exist to digitally remove blemishes, touch-up makeup, and even to warp and blend elements of images, there are few conventional tools and techniques specifically directed to manipulating hair, or similar directional textures, in 2D images. In addition to the directionality of hair, hair has a fine structure. Most computer graphics efforts involving hair have been centered on 3D animated characters, realistic dynamics and optics of hair, and rendering of large numbers of individual hair strands comprising a typical hairstyle. A typical human head hosts several hundred thousand hairs. Rendering and manipulating hairs individually, as is done in many conventional hair rendering techniques, is complex and time-consuming. In addition, rendering coarser textures is simpler than rendering very fine textures such as hair because artifacts that may lessen the visual appearance of a coarse texture may totally annihilate a fine texture.

In digital art creation workflows where the end product is not an animation but a single, high-quality image, conventional 3D approaches to rendering hair have several disadvantages. Many 3D hairstyles are simulation-driven, thus limiting precise control. The high computational cost of simulation and rendering makes it difficult if not impossible to interactively design and visualize hairstyles, requiring many trial-and-error iterations.

Conventional procedural approaches for human hair analysis and synthesis exists; however, these conventional approaches rely on the user to design low-frequency lighting manually via ellipsoidal Gaussian kernels, and address high-frequency component generation only at a single scale or frequency.

SUMMARY

Various embodiments of methods and apparatus for directional texture generation are described. Embodiments of the directional texture generation methods may leverage the realism of existing images, including but not limited to digital photographs and digitized photographs, and texture-synthesis techniques. Embodiments may enable users to extend and manipulate directional texture elements, such as hair, in existing photographs, and may also enable users to create realistic, high-quality directional texture elements, such as hairstyles, from scratch. Embodiments may provide various directional texture generation methods that are relatively fast compared to conventional techniques, and that are capable of producing a large range of directional texture styles with good visual quality. Embodiments may provide parameterization to allow modifications of created directional texture, for example hair, such as re-lighting, moving hairlines, moving parts, combing, cutting, curling, fluffing, etc.

Various embodiments of a directional texture generation system may implement one or more of the directional texture generation methods. Several directional texture generation methods are described that include procedural directional texture generation methods, texture synthesis directional texture generation methods, and image warping directional texture generation methods. The directional texture generation methods may be used independently, or two more or more of the directional texture generation methods may be used in various combinations.

In at least some embodiments of an image warping directional texture generation method, a target image may be obtained. The target image may, for example, be a digital photograph or synthesized image, or may be an output image of any of the directional texture generation methods. A primitive may be obtained. For example, a primitive may be selected from a collection or library of primitives via one of one or more user interface methods. The primitives may include images of real examples of the directional texture element and/or primitives that are synthesized examples of the directional texture element. In at least some embodiments, the collection of primitives may include one or more primitives each containing multiple atomic texture elements, for example multiple hairs. In at least some embodiments, the collection of primitives may include one or more higher-level, hierarchical primitives each containing two or more other primitives. For example, a collection of hair primitives may include primitives that represent an isolated strand of hair or a piece of hair, a collection of strands or pieces, or any other suitable component of hair, and also may include hierarchical primitives that each include two or more other hair primitives. The combination and/or blending of primitives in an image may be used to generate or synthesize a seamless and believable-looking aggregate structure of the directional texture element, such as hair.

The selected primitive may be applied to the target image, for example by a stroke applied by the user via the user interface. For example, the primitive may be applied as a "painted" stroke using a brush or similar user interface element. The method may automatically adjust the selected primitive according to the stroke. For example, in some embodiments, a grid representing the selected primitive may be generated, and the grid may be distorted according to the direction of flow indicated by the stroke. The adjusted primitive may be appropriately blended with image data in the target image. The selected primitive may also be stretched in one or more directions.

In adjusting the primitive, the primitive may be distorted; for example, the primitive may be bent or stretched, which may result in distortion artifacts. Regions of the adjusted primitive that may include distortion artifacts, if any, may be automatically processed to remove or reduce distortion artifacts. For example, in some embodiments, regions that may include distortion artifacts may be identified using one or more user-specified distortion thresholds. Content of the identified regions may then be re-synthesized. For example, in some embodiments, an identified region may be re-synthesized using a texture synthesis approach such as the sample-based texture synthesis method. Alternatively, in some embodiments, the original image data contained in the identified region may be artificially extended, or shrunk, using a content-aware scaling approach, such as seam carving or content-aware fill.

While embodiments are generally described as being directed to hair design and styling in images, and the examples that are provided are directed to hair design and styling, the directional texture generation methods are not limited to designing and styling hair. Embodiments of the directional texture generation methods may also be applied to other directional elements than hair. The characteristics of hair in an image is that hair tends to have a directional flow or texture, as well as a fine structure (e.g., hair fibers) which in some cases may have an extent at or near the limit of display resolution (i.e., at the pixel level). Embodiments of the directional texture generation methods may be broadly applicable to designing and styling any elements of images that exhibit a similar directional and fine structure texture characteristic, such as flowing water, some types of vegetation, some types of textiles or fabric, some types of stone, pipes or wires, wood grain, and so on.

Figure 1:
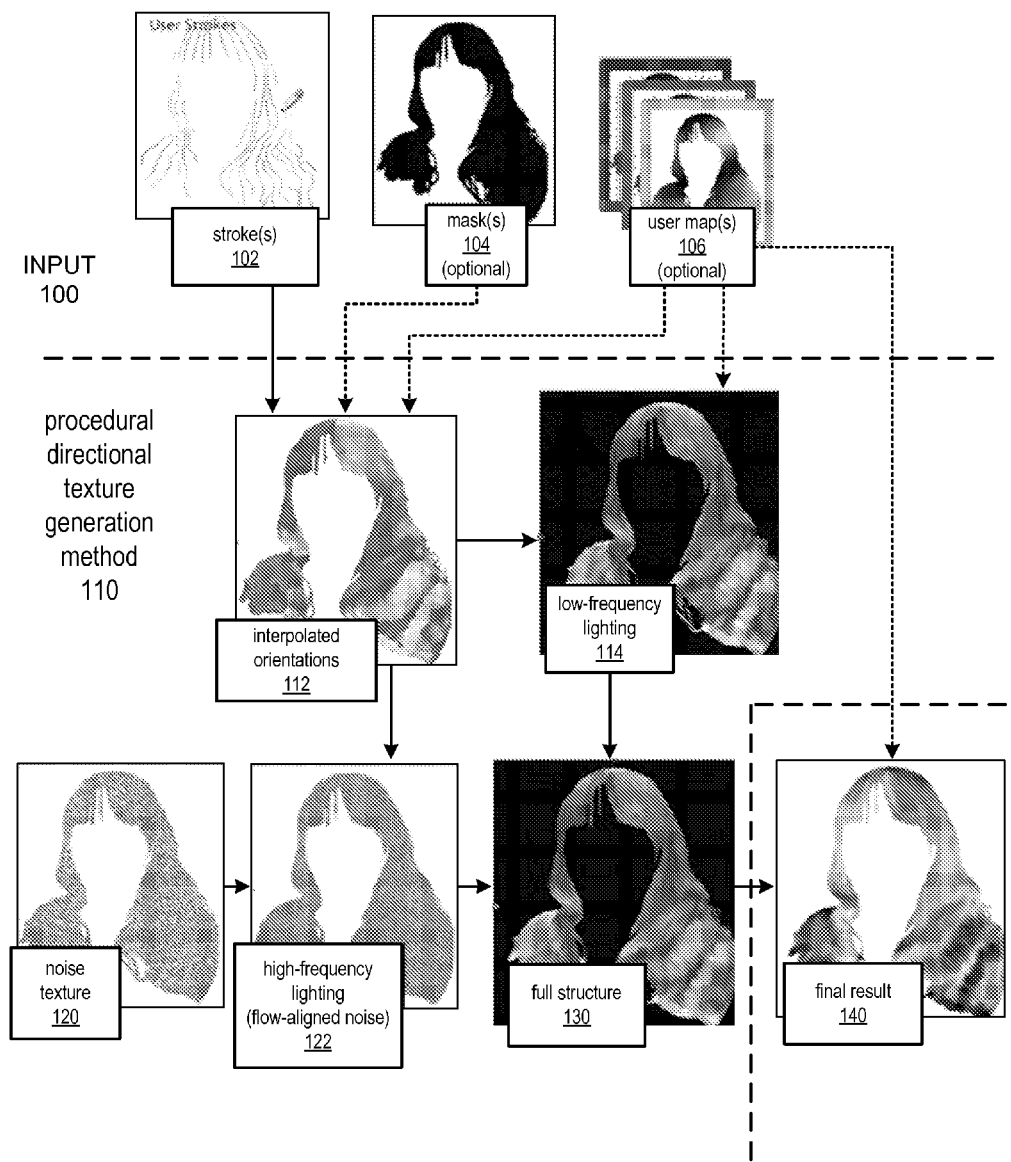
FIG. 1 is a block diagram illustrating a workflow for a procedural directional texture generation method, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for directional texture generation are described. Embodiments of the directional texture generation methods may leverage the realism of existing images, including but not limited to digital photographs and digitized photographs, and texture-synthesis techniques. Embodiments may enable users to extend and to manipulate directional texture elements, such as hair, in existing photographs, and may also enable users to create realistic, high-quality directional texture elements, such as hairstyles, from scratch. Embodiments may provide various directional texture methods that are relatively fast compared to conventional techniques, and that are capable of producing a large range of directional texture styles with good visual quality. Embodiments may provide parameterization to allow modifications of created directional texture, for example hair, such as re-lighting, moving hairlines, moving parts, combing, cutting, curling, fluffing, etc.

Various embodiments of a directional texture generation system may implement one or more of the directional texture generation methods as described herein. Several directional texture generation methods are described that include procedural directional texture generation methods, sample-based texture synthesis directional texture generation methods, and image warping directional texture generation methods. The directional texture generation methods may be used independently, or two more or more of the image-based hair design and styling methods may be used in various combinations.

Figure 20:
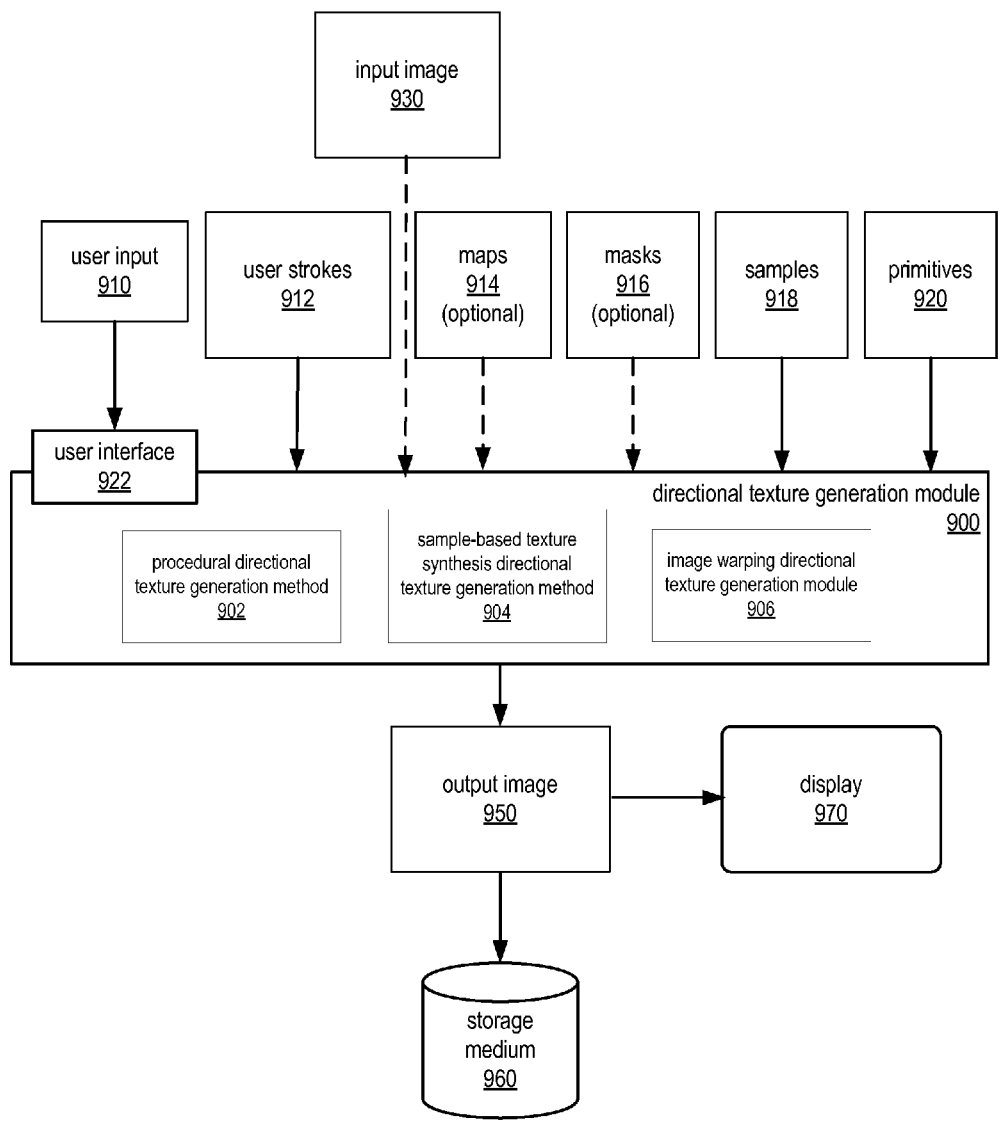
FIG. 20 illustrates an example directional texture generation module that may implement one or more of the directional texture generation methods illustrated in FIGS. 1 through 19.
Figure 21:
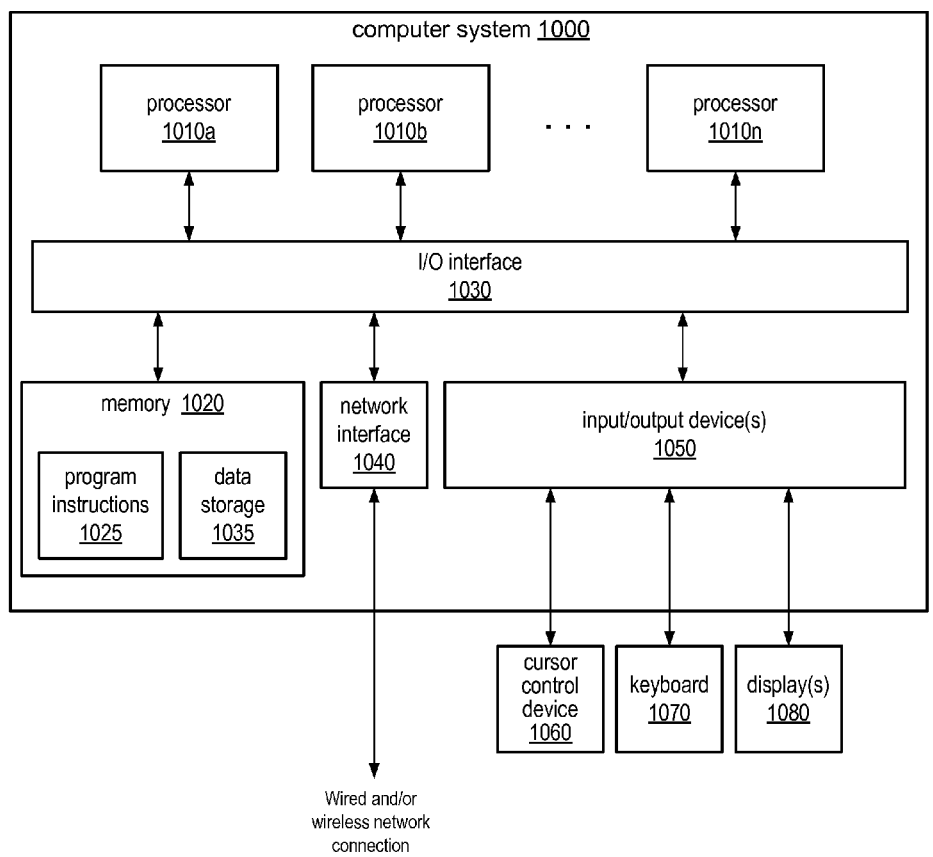
FIG. 21 illustrates an example computer system that may be used in embodiments.

Embodiments of the directional texture generation methods may be performed by a directional texture generation module implemented by program instructions stored in a computer-readable storage medium and executable by one or more processors (e.g., one or more CPUs or GPUs). Various embodiments of a directional texture generation module may implement one or more of the directional texture generation methods as submodules. Embodiments of a directional texture generation module may, for example, be implemented as a stand-alone application, as a module of an application, as a plug-in for applications including image processing applications, and/or as a library function or functions that may be called by other applications such as image processing applications. Embodiments of the directional texture generation module may be implemented in any image processing application, including but not limited to Adobe® PhotoShop® Adobe® PhotoShop® Elements®, Adobe® After Effects®, Adobe® Illustrator®, and Adobe® Flash®. "Adobe", "Photoshop", "Elements", "After Effects", "Illustrator", and "Flash" are either registered trademarks or trademarks of Adobe Systems Incorporated in the United States and/or other countries. An example directional texture generation module that may implement one or more of the directional texture generation methods is illustrated in FIG. 20. An example system on which a directional texture generation module or one or more of the directional texture generation methods may be implemented is illustrated in FIG. 21.

While embodiments are generally described as being directed to hair design and styling in images, and the examples that are provided are generally directed to hair design and styling, the directional texture generation methods described herein are not limited to designing and styling hair. Embodiments of the directional texture generation methods described herein may also be applied to other elements of images than hair. The characteristics of hair in an image is that hair tends to have a directional flow or texture, as well as a fine structure (e.g., hair fibers) which in some cases may have an extent at or near the limit of display resolution (i.e., at the pixel level). Embodiments may be broadly applicable to designing and "styling" any elements of images that exhibit similar directional flow and/or fine structure texture characteristics, such as flowing water, some types of vegetation, some types of textiles or fabric, some types of stone, pipes or wires, wood grain, and so on.

Procedural Directional Texture Generation

Figure 6:
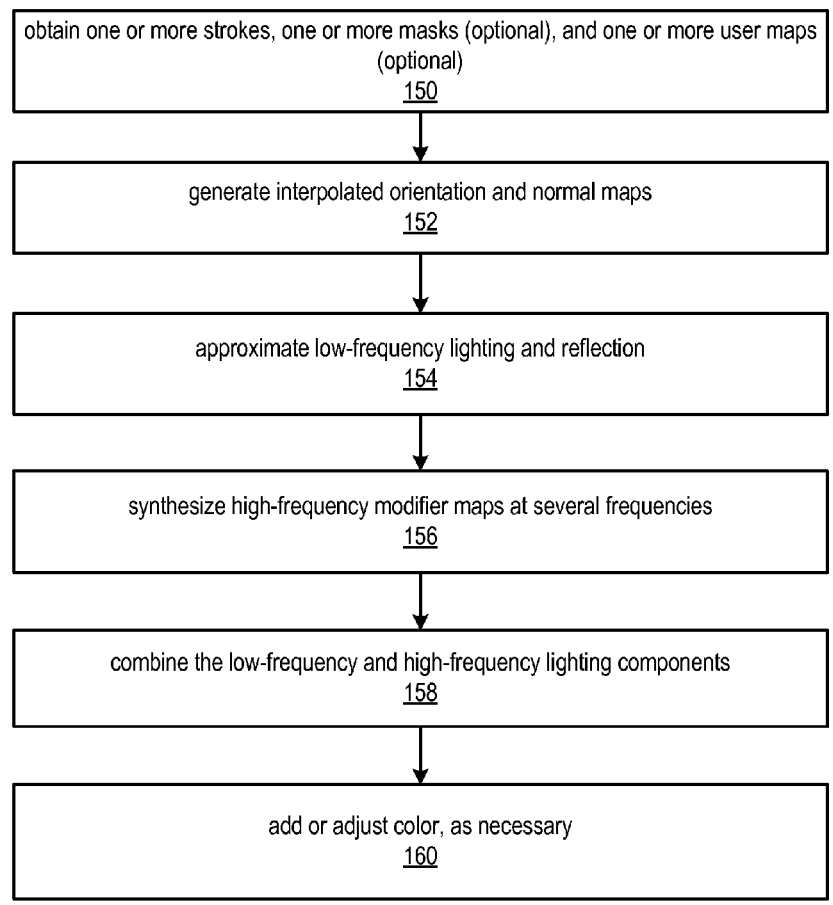
FIG. 6 is a flowchart of a procedural directional texture generation method, according to some embodiments.
Figure 7:
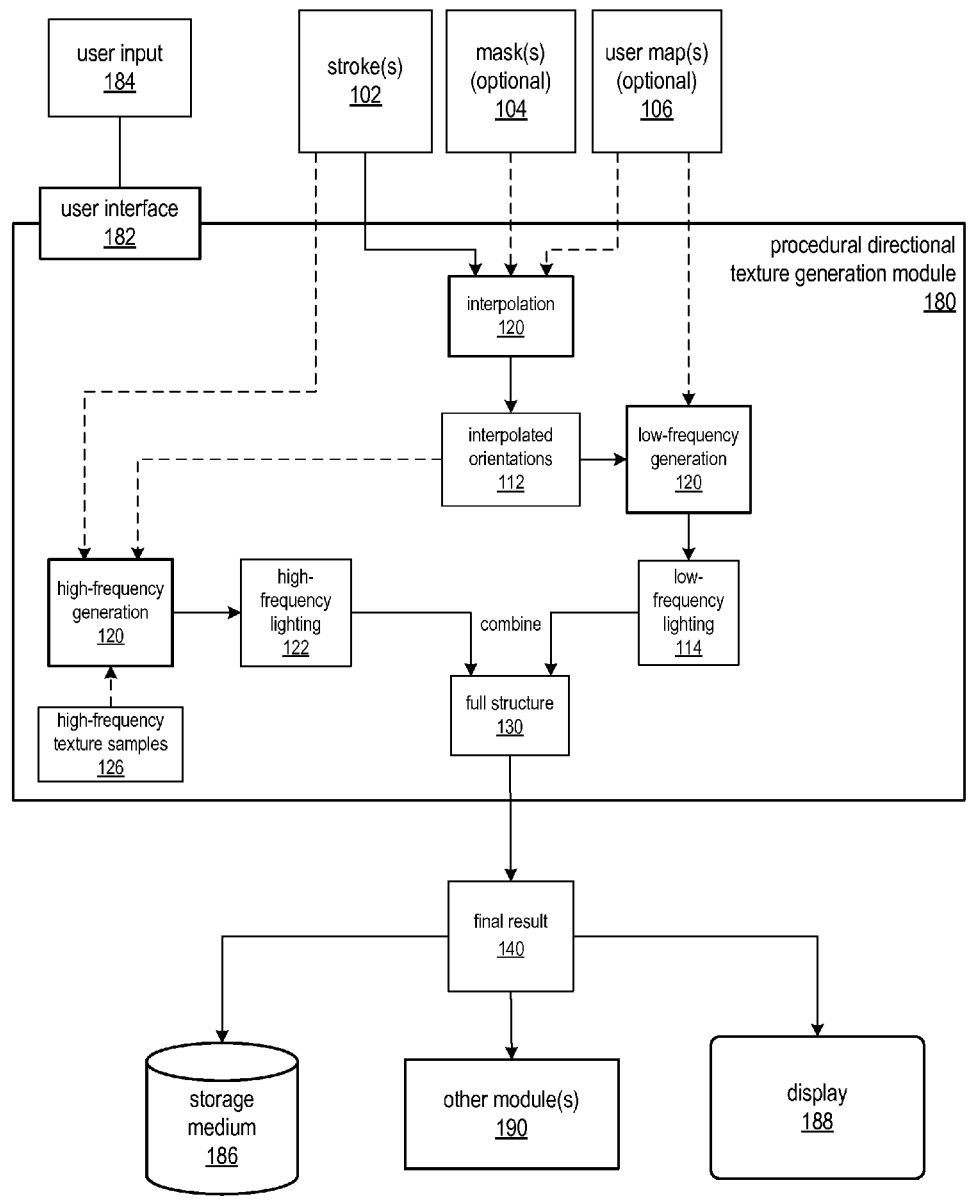
FIG. 7 illustrates an example procedural directional texture generation module that may implement a procedural directional texture generation method as illustrated in FIGS. 1 through 6.

FIG. 1 is a block diagram illustrating a workflow for a procedural directional texture generation method, according to some embodiments. The procedural directional texture generation method 110 may, for example, be used to design hair or hairstyles. In this description, hair design and styling is used as an example; however, other directional texture elements may also be designed or modified using embodiments. FIG. 6 is a flowchart of a procedural directional texture generation method. Embodiments of the procedural directional texture generation method may be performed by a procedural directional texture generation module implemented by program instructions stored in a computer-readable storage medium and executable by one or more processors (e.g., one or more CPUs or GPUs). Embodiments of a procedural directional texture generation module may, for example, be implemented as a stand-alone application, as a module of an application, as a plug-in for applications including image processing applications, and/or as a library function or functions that may be called by other applications such as image processing applications. Embodiments of the procedural directional texture generation module may be implemented in any image processing application, including but not limited to Adobe® PhotoShop® Adobe® PhotoShop® Elements®, Adobe® After Effects®, Adobe® Illustrator®, and Adobe® Flash®. An example procedural directional texture generation module is illustrated in FIG. 7. A procedural directional texture generation module may be implemented as a stand-alone module or as a submodule of a directional texture generation module that implements one or more other types of directional texture generation methods as submodules, as illustrated in FIG. 20. An example computer system that may implement embodiments of a procedural directional texture generation module is illustrated in FIG. 21.

Input

Embodiments of a procedural directional texture generation method 110 may utilize one or more of various inputs 100. The inputs 100 may include, but are not limited to, stroke(s) 102, optional mask(s) 104, and optional map(s) 106. The one or more strokes 102 indicate what an artist would draw in a sketching style. In some embodiments, the user draws one or more strokes in the intended direction of the hair flow to generate an input pixel map or bitmap that represents stroke(s) 102. For example, the user may draw one or more strokes on paper and then scan the drawing to generate a digital image representation of the strokes, or may draw one or more strokes to a user interface of a drawing program or application to generate a digital image representation of the strokes. Stroke(s) 102 may, for example, be used to derive directions and orientations locally for how the hair should flow. One or more optional masks 104 may be used to limit or constrain the effects that other inputs 100 have on the intermediate and final results. A mask 104 may be user-specified. For example, the user may draw the mask on paper and then scan the drawing to generate a digital image representation, or may create the mask via a user interface of a drawing program or application to generate a digital image representation. Alternatively, a mask 104 may be automatically derived from other input 100, for example from a digital image representation of stroke(s) 102. As an example, a mask 104 may specify a region into which the directional texture element is to be synthesized to generate a directional texture element instance. One or more additional user maps 106 may optionally be input and used to alter the behavior of one or more steps of the procedural directional texture generation method, for example to encode mapping or transfer functions, to generate or provide additional masks 104, etc. A user map 106 may specify a constraint for the directional texture element to be generated. Note that a mask 104 may be considered a special case of a user map 106.

While FIG. 1 shows stroke(s) 102, user maps 106 and other input 100 as image data such as pixel maps or bitmaps, various input 100 may be provided in functional, vectorial, or parametric form instead of or in addition to image data in various embodiments.

Interpolated Orientations

Procedural directional texture generation method 110 may apply one or more of various techniques, for example interpolation techniques, to input 100 to generate interpolated orientations 112 that may be used in generating high-frequency lighting 114 and low-frequency lighting 122. Interpolated orientations 112 may include but are not limited to, one or more orientation/tangential fields or maps, and one or more normal fields or maps. An orientation/tangential field or map may be specified in a number of ways. For example, in some embodiments, the user can draw one or more strokes in the intended direction of the directional texture element (e.g., hair) flow, as shown by stroke(s) 102. In some embodiments, these sparse directions may then be interpolated with a suitable technique (e.g. blurring, morphological operations, diffusion, etc.) The orientation/tangential field or map indicates the intended directions of flow for an instance of the directional texture element. Similarly to the orientation/tangential field, in some embodiments, a normal field or map may be extracted from stroke(s) 102, for example via an interpolation technique, and modulated by a geometry proxy shape (e.g., a sphere or an ellipsoid). The normal field or map indicates surface normals for the instance of the directional texture element modulated by the proxy shape. Modulating the normal field by the proxy shape may in effect provide a 2.5D structure to the directional texture element, as if the directional texture element was draped over the proxy shape. The directional texture element has its own geometry, but the proxy shape adds additional geometry to that geometry.

Note that the orientation/tangential map(s) and the normal map(s) may collectively be referred to as orientation maps.

Low-Frequency Lighting and Structure

Figure 2:
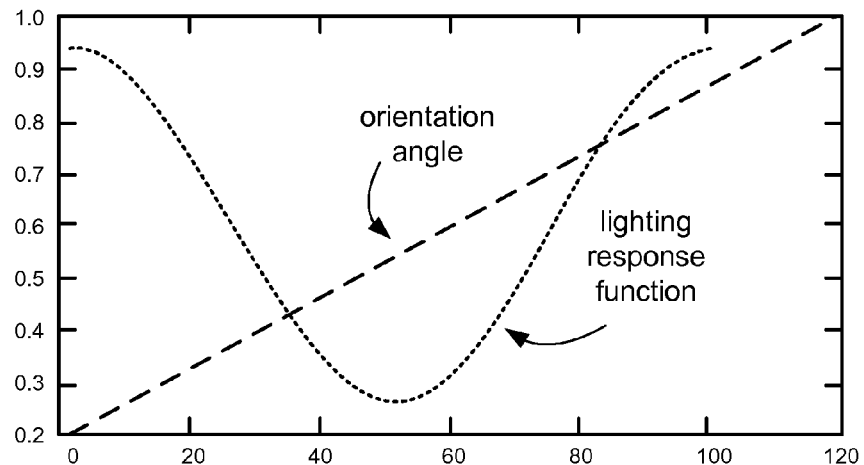
FIG. 2 illustrates mapping the orientation angle to a brightness response via a cosine function, according to some embodiments

In some embodiments of a procedural directional texture generation method 110, to approximate low-frequency lighting and reflection on the hair, the method 110 takes the interpolated orientation and normal map (interpolated orientations 112 in FIG. 1), and possibly one or more optional user maps 106, and uses these to synthesize low-frequency lighting 114. In some embodiments, this synthesis may be performed by mapping the orientation angle to a brightness response function via, for example, a cosine-function, as illustrated in FIG. 2.

Some embodiments may consider higher-order terms, such as curvature, or change of curvature into the response function, in order to obtain more realistic and believable lighting results. Additionally, in various embodiments, any number of suitable response functions—functional, arithmetic, or user-defined—may be used to compute the lighting response. The intermediate low-frequency lighting result is shown as low-frequency lighting 114 in FIG. 1.

Lighting Effects

In some embodiments, by changing the phase and shape of the response function, different light-directions and directional texture element (e.g., hair) materials may be emulated. For example, shinier hair has sharper highlights, which may be modeled by a response function with a narrower peak. In some embodiments, one or more virtual light sources (e.g., directional or point-lights) may be used in conjunction with normal-map information to affect the shading and reflection of light on the virtual directional texture element (e.g., hair). In some embodiments, one or more of various rendering equations may be employed, such as Phong shading or Gouraud shading. In some embodiments, one or more of various specific directional texture element (e.g., hair) shading models may be employed.

Geometry Proxy

Figure 3:
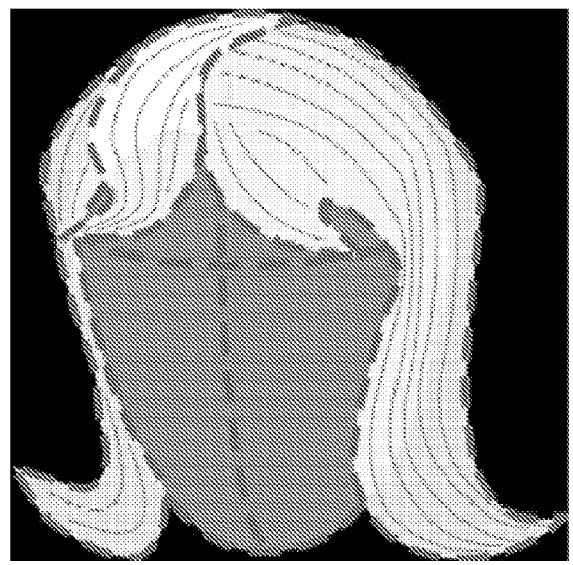
FIG. 3 illustrates a head-geometry proxy that may be used in some embodiments.

In some embodiments, to achieve more realistic looking lighting effects, the user may provide the position and orientation of a coarse geometry proxy, for example a head-geometry proxy such as a sphere or ellipsoid for a directional texture element such as hair, as illustrated in FIG. 3. In some embodiments, this geometric shape may be used to modify the lighting response function to take into account the local orientation of the indicated shape.

High-Frequency Lighting and Structure

For realistic hair-appearance, low-frequency lighting 114 may be insufficient, as it may not be capable of emulating the desired visual appearance of the directional texture element, for example the appearance of hair-strands and individual hair fibers. To generate these effects, some embodiments may synthesize high-frequency modifier maps at several frequencies. The combined high-frequency layers are collectively labeled high-frequency lighting 122 (flow-aligned noise) in FIG. 1. Low-frequency layers may be intended to emulate coarse geometric structure of the directional texture element, such as overall shape of a hairdo, partings, strands of hair, while high-frequency layers may be intended to emulate fine structure, such as hair fibers.

Generating the High-Frequency Component

Figure 4:
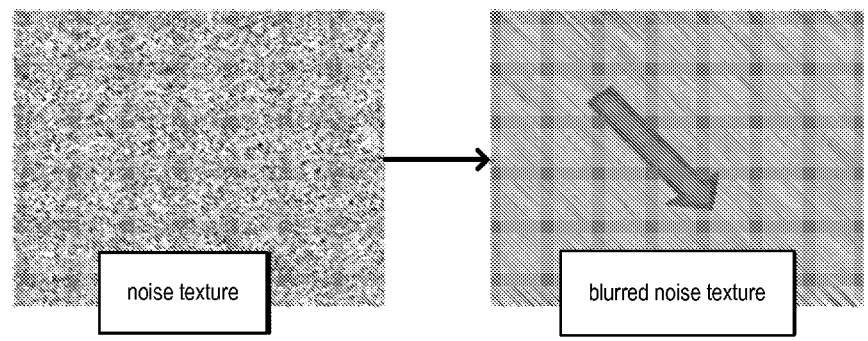
FIG. 4 illustrates a directional blur that may be used in some embodiments.

In some embodiments, to generate the high-frequency directional texture element component (high-frequency lighting 122), a noise texture or noise map (shown as noise texture 120 in FIG. 1) may be generated at each frequency (or at a selection of frequencies) according to a noise function. Suitable noise functions that may be used in various embodiments may include, but are not limited to: Salt-and-Pepper, Gaussian, Blue-noise, Perlin noise, and in general any function that produces isotropic or anisotropic noise with desirable characteristics. In some embodiments, a noise map, if it does not already have desirable anisotropic (directional) characteristics which make it appear, for example, like hair-strands or individual hair fibers, may be further processed to generate such characteristics, for example via a directional blur, as in the example shown in FIG. 4. Note that the blur does not need to be uniform or unidirectional, and may vary across the image, for example according to an optional user map 106. An example of such a guided blur that may be used in embodiments is a line-integral-convolution (LIC). In some embodiments, the noise-textures may be blurred in the direction of the stroke(s) 102 shown in FIG. 1, to create the appearance of hair strands and individual hair fibers flowing along the user-specified directions.

Orientation Variations

In the general case, a user may draw one or more broad guiding strokes for texture directions (e.g., hair directions). This implies that the original and interpolated orientations may appear too uniform. To introduce a greater measure of local orientation variation, some embodiments may perturb the orientations (as well as any given normals, or possibly other user maps 106) with additional noise maps. In some embodiments, an orientation map may be perturbed procedurally to achieve an effect or effects such as curly or wavy hair.

Alternative High-Frequency Component Generation via Texture Synthesis

Figure 5:
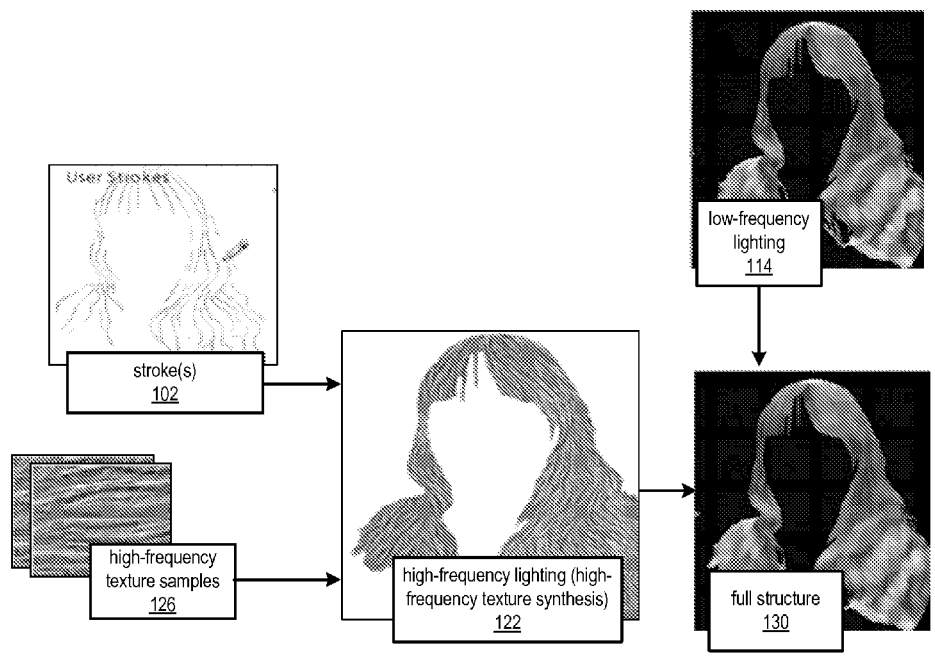
FIG. 5 illustrates a procedural directional texture generation method using flow-guided texture synthesis to generate a high-frequency component, according to some embodiments.

FIG. 5 illustrates a procedural directional texture generation method using flow-guided texture synthesis to generate a high-frequency component, according to some embodiments. In some embodiments of a procedural directional texture generation method as illustrated in FIG. 1, as an alternative to using noise texture 120 to generate flow-aligned noise as the high-frequency component 122, a flow-guided texture synthesis technique may instead be used to generate high-frequency lighting 122, as illustrated in FIG. 5. The flow-guided texture synthesis method may be used to generate high-frequency lighting 122 that may have more inherent local variations than may be possible using noise texture 120 to generate flow-aligned noise as high-frequency lighting 122 as described above. For example, for hair, local variations generated by the flow-guided texture synthesis method may include color variations, waves, curls, locks, occlusions, and so on. In some embodiments, the flow-guided texture synthesis method that may be used to generate high-frequency lighting 122 may operate similarly to the sample-based texture synthesis directional texture generation methods described later in this document, but taking local orientation into account when choosing a source patch from a texture sample 126 to be applied to the target image. By using a source image with desirable high-frequency characteristics, some embodiments may synthesize high-frequency lighting 122 with similar characteristics, but aligned to the desired stroke 102 directions. While FIG. 5 shows user stroke(s) 102 as input to generate high-frequency lighting 122 according to the flow-guided texture synthesis method, in some embodiments, one or more interpolated orientations 112 as shown in FIG. 1 may instead be input to generate high-frequency lighting 122 according to the flow-guided texture synthesis method. In addition, while not shown in FIG. 5, in some embodiments optional mask(s) 104 and/or user map(s) 106 may also be input to generate high-frequency lighting 122 according to the flow-guided texture synthesis method.

To add more variability in the high-frequency lighting 122, some embodiments may use not just one but multiple high-frequency source textures in the texture synthesis method. For example, source patches may be selected from multiple source textures at random, selected from different source textures, as guided by user maps, and/or selected from different source textures, as guided by a combination of user maps and other generated data, such as other high-frequency maps, or low-frequency maps.

Combining the Low- and High-Frequency Components

In various embodiments, the low-frequency lighting 114 may be combined with the high-frequency lighting 122 via various techniques to generate full structure 130 as shown in FIGS. 1 and 5. In some embodiments, the combination may be guided by one or more user maps 106. A combination technique that may be used in some embodiments is to blend contributions of low- and high-frequency lighting as follows:

$$I = w_L L_L + \sum_i w_{H_i} L_{H_i}$$

or:

$$I = w_L L_L + \sum_i (w_{L_i} L_L \cdot w_{H_i} L_{H_i})$$

or similar. I represents the intensity of the resulting pixel, $L_L$ represents a low-frequency lighting component, $L_{H_i}$ represents each of the high-frequency lighting components, and $w_X$ represent weights for low- and high-frequency components. Different blending operations are possible, but the basic idea is to modulate the low-frequency component by adding high-frequency components of varying frequency contributions. The result of the combination of low-frequency lighting 114 and high-frequency lighting 122 is shown as full structure 130 in FIGS. 1 and 5.

Color

The previous discussion does not specifically address the issue of color. Color can be considered in a number of ways. For example, in some embodiments, color information may be encoded in user maps 106, and generated directly when producing the low-frequency lighting 114 and high-frequency lighting 122. Alternatively, the hair structure (full structure 130) may be generated purely in grayscale, thus just encoding brightness information. Color may then be added in a final transformation step, and may be guided by one or more optional user maps 106 and/or low-frequency lighting 114 and high-frequency lighting 122 to generate final result 140.

Applications

The final, possibly colored results (final result 140 in FIG. 1) may, for example, be used as is, may be overlaid on top of a photograph or other image to effectively render, for example, hair into that photograph or image, or may be used as input to any of the directional texture generation methods described herein. For example, procedurally constructed hair (final result 140 in FIG. 1) may be used as a matching template for a texture synthesis directional texture generation method to synthesize hair that is similar in structure, flow, and lighting to the procedurally constructed hair but which uses real hair textures as source material for the texture synthesis.

Directional Texture Manipulation in Images

In some embodiments, the stroke(s) 102 and one or more optional mask(s) 104 and user map(s) 106 shown as input 100 in FIG. 1 may be automatically derived from an input image (e.g., a digital photograph). The procedural directional texture generation method may then be used to effectively manipulate the directional texture content (e.g., hair) in the image. In some embodiments, the following method or variations thereof may be used to automatically derive input 100 from an input image.

The input image is analyzed. To compute the equivalent of stroke(s) 102, various embodiments may compute the response of a blurred Sobel filter, perform edge detection on the image (e.g. Canny edges, or Difference-of-Gaussian edge), or perform any other suitable structure analysis step. In various embodiments, a mask or masks 104 may be derived from any suitable content-aware selection mechanism, such as an automated version of Adobe® Photoshop® Quick Select® tool or Magic Wand® tool, or other smart-selection tool. In various embodiments, low-frequency lighting and high-frequency lighting may either be computed as previously described, or alternatively may be derived from the input image and subsequently modified to create different hair appearances. In some embodiments, to obtain a frequency decomposition, the image may be iteratively split into low-frequency and high-frequency components. The low-frequency component(s) may, for example, be obtained via low-pass filtering (such as Gaussian blurring, bilateral filtering, etc.). The high-frequency component is then the residual, i.e. the original image/signal minus the low-frequency component. To obtain further decompositions, the same step may be applied recursively to the lower or higher frequency components. Low-frequency components and/or high-frequency components derived by such a decomposition may then be modified and used as the low-frequency lighting or the high-frequency lighting, respectively.

FIG. 6 is a flowchart of a procedural directional texture generation method, according to some embodiments. A procedural directional texture generation method may obtain one or more strokes, as indicated at 150. In addition, the method may obtain one or more optional masks and one or more optional user maps, as indicated at 150. In some embodiments, an orientation/tangential map and a normal map may be specified by or derived at least in part from the one or more strokes. For example, in some embodiments, the user draws one or more strokes in the intended direction of the hair flow to generate an input pixel map or bitmap that represents the one or more strokes. Alternatively, the one or more strokes or other input may be provided in functional, vectorial, or parametric form. As indicated at 152, interpolated orientation and normal maps may be generated. In some embodiments, to generate the interpolated maps, the provided one or more strokes may be interpolated with a suitable mechanism (e.g. blurring, morphological operations, diffusion, etc.) to produce the interpolated orientation/tangential map and normal map. In some embodiments, the normal field may be extracted from the one or more strokes and modulated by geometry proxy shapes (i.e. a sphere or an ellipsoid; see for example FIG. 3).

As indicated at 154, low-frequency lighting and reflection may be approximated. In some embodiments, the interpolated orientation and normal maps, optionally along with one or more user maps, may be used to compute synthetic low-frequency lighting. In some embodiments, this may be performed by mapping the orientation angle to a brightness response via, for example, a cosine-function. Some embodiments may consider higher-order terms, such as curvature, or change of curvature into the response function, in order to obtain more realistic and believable lighting results. Additionally, in various embodiments, any number of suitable response functions—functional, arithmetic, or user-defined—may be used to compute the low-frequency lighting response.

As indicated at 156, high-frequency modifier maps may be synthesized at several frequencies. In some embodiments, to generate a high-frequency map, a noise texture or noise map (shown as noise texture 120 in FIG. 1) may be generated at each frequency or at a selection of frequencies and aligned according to the flow indicated by the one or more strokes; the flow-aligned noise at the different frequencies may then be combined to produce the high-frequency map. As an alternative, in some embodiments, a flow-guided texture synthesis method may be used to generate high-frequency maps that may have more inherent local variations, as shown in FIG. 5.

Returning to FIG. 6, as indicated at 158, the low-frequency lighting may be combined with the high-frequency lighting to generate a desired frequency spectrum. In some embodiments, the combination may be guided by one or more optional user maps. A combination technique that may be used in some embodiments is to apply a blending technique to blend the contributions of the low- and high-frequency lighting components.

As indicated at 160, color may be generated for the resultant image, if necessary or desired. In some embodiments, color information may be encoded in one or more optional user maps, and generated directly when producing the low-frequency and high-frequency maps. Alternatively, the directional texture structure (e.g., hair) may be generated purely in grayscale, thus just encoding brightness information. Color may then be added in a final transformation step, and may be guided by one or more optional user maps and/or low-frequency and high-frequency maps.

FIG. 7 illustrates an example procedural directional texture generation module that may implement a procedural directional texture generation method as illustrated in FIGS. 1 through 6. FIG. 21 illustrates an example computer system on which embodiments of module 180 may be implemented. Module 180 may receive, as input, one or more strokes 102, optional mask(s) 104, and optional user maps 106, and possibly other input. In some embodiments, module 180 may receive as input an input image, for example a digital photograph, from which one or more of stroke(s) 102, user maps 106, and mask(s) 104 may be automatically generated. In some embodiments, module 180 may provide a user interface 182 via which a user may interact with the module 180 to provide user input 184, for example settings for or adjustments to various parameters used by the procedural directional texture generation method, file names or locations, and so on.

Figure 11:
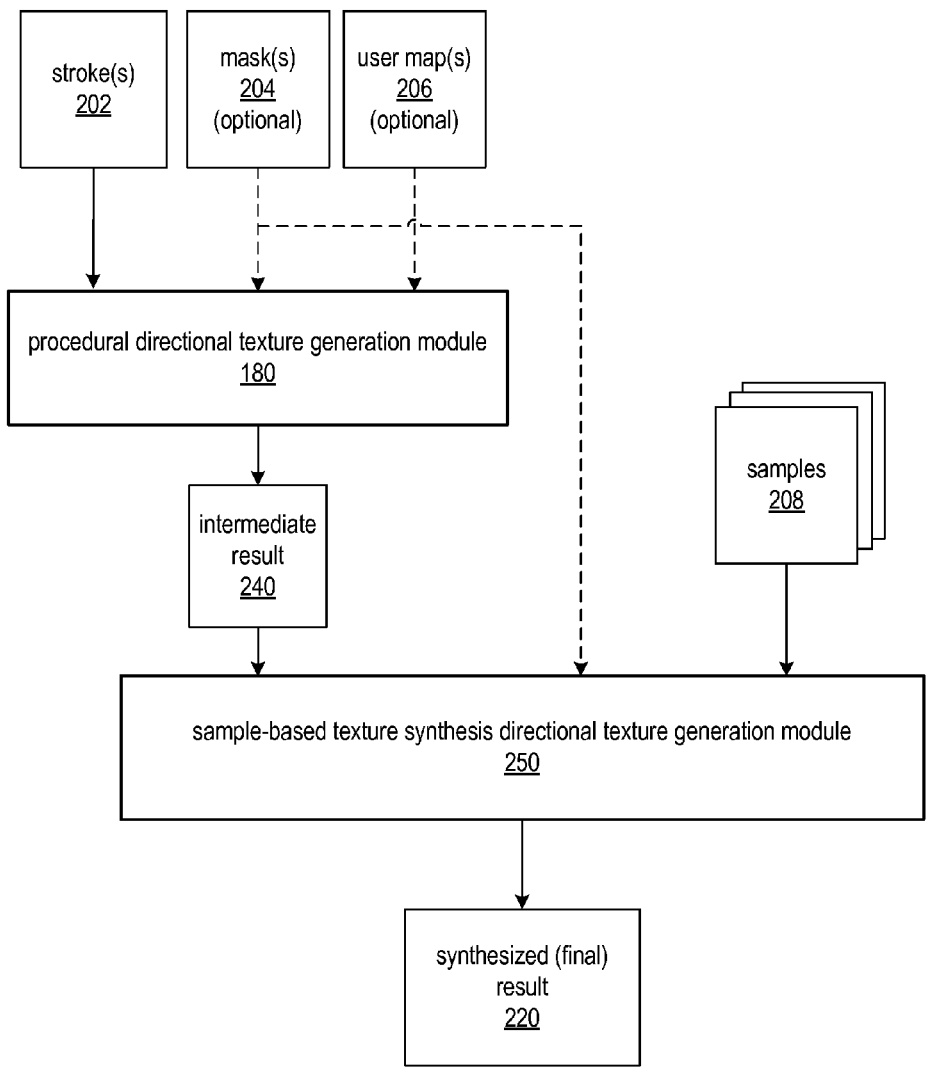
FIG. 11 illustrates an example sample-based texture synthesis directional texture generation module using a procedural directional texture generation method as a pre-processing step.

Module 180 performs the procedural directional texture generation method, for example as described in FIGS. 1 through 6, according to the input. Module 180 generates, as output, final result 140. Final result 140 may, for example, be stored to a storage medium 186, such as system memory, a disk drive, DVD, CD, etc., and/or displayed to a display device 188. In at least some embodiments, final result 140 may be used as input to another directional texture generation method. For example, final result 140 may be used as input to a texture synthesis directional texture generation method, as shown in FIG. 11. As another example, final result 140 may be used as a sample in a texture synthesis directional texture generation method. As another example, final result 140 may be used as input to an image warping directional texture generation method, for example as a primitive or as a target image.

Sample-Based Texture Synthesis Directional Texture Generation Method

Figure 8:
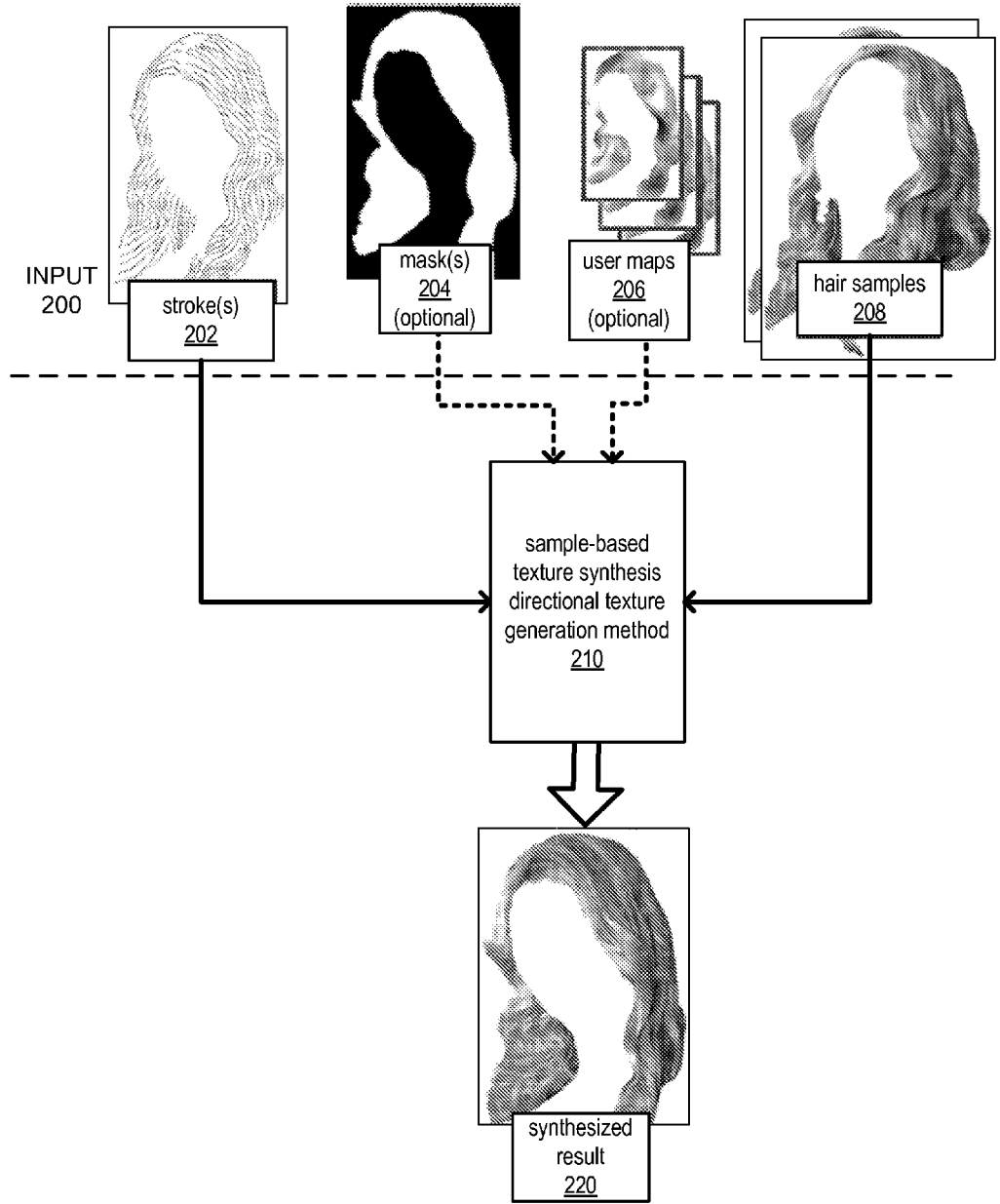
FIG. 8 is a block diagram illustrating a workflow for a flow-guided, sample-based texture synthesis directional texture generation method, according to some embodiments.
Figure 9:
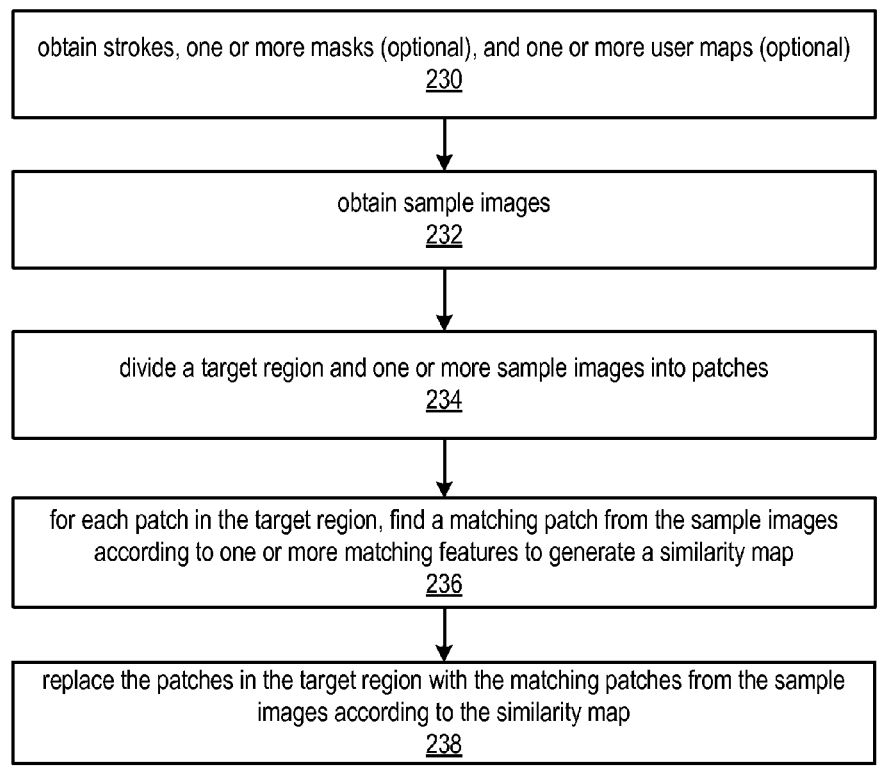
FIG. 9 is a flowchart of a sample-based texture synthesis directional texture generation method, according to some embodiments.
Figure 10:
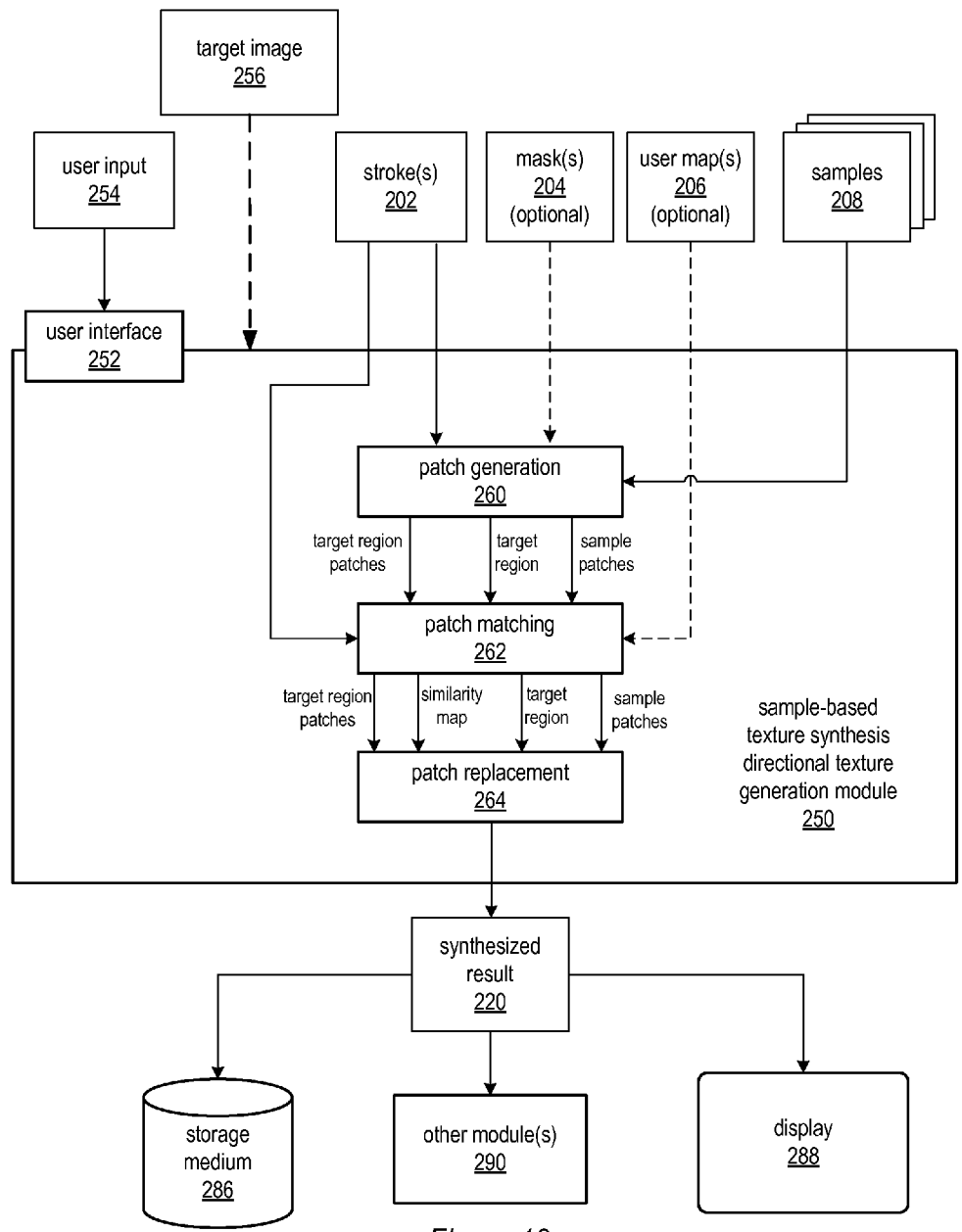
FIG. 10 illustrates an example sample-based texture synthesis directional texture generation module that may implement a sample-based texture synthesis directional texture generation method as illustrated in FIGS. 8 and 9.

FIG. 8 is a block diagram illustrating a workflow for a flow-guided, sample-based texture synthesis directional texture generation method, according to some embodiments. The texture synthesis directional texture generation method 210 may, for example, be used to synthesize hair or hairstyles. In this description, hair design and styling is used as an example; however, other directional texture elements may also be designed or modified using embodiments. FIG. 9 is a flowchart of a flow-guided, sample-based texture synthesis directional texture generation method according to some embodiments. Embodiments of the texture synthesis directional texture generation method may be performed by a texture synthesis directional texture generation module implemented by program instructions stored in a computer-readable storage medium and executable by one or more processors (e.g., one or more CPUs or GPUs). Embodiments of a texture synthesis directional texture generation module may, for example, be implemented as a stand-alone application, as a module of an application, as a plug-in for applications including image processing applications, and/or as a library function or functions that may be called by other applications such as image processing applications. Embodiments of the texture synthesis directional texture generation module may be implemented in any image processing application, including but not limited to Adobe® PhotoShop® Adobe® PhotoShop® Elements®, Adobe® After Effects®, Adobe® Illustrator®, and Adobe® Flash®. An example sample-based texture synthesis directional texture generation module is illustrated in FIGS. 10 and 11. A texture synthesis directional texture generation module may be implemented as a stand-alone module or as a submodule of a directional texture generation module that implements one or more other types of directional texture generation methods, as illustrated in FIG. 20. An example computer system that may implement embodiments of a texture synthesis directional texture generation module is illustrated in FIG. 21.

Input

The sample-based texture synthesis directional texture generation method, illustrated in FIG. 8, may receive as input 200 one or more strokes 202, optional mask(s) 204, and in some embodiments one or more optional user maps 206. The one or more strokes 202 indicate what an artist would draw in a sketching style. In some embodiments, the user draws one or more strokes in the intended direction of the hair flow to generate an input pixel map or bitmap that represents stroke(s) 202. For example, the user may draw one or more strokes on paper and then scan the drawing to generate a digital image representation, or may draw one or more strokes to a user interface of a drawing program or application to generate a digital image representation. Stroke(s) 202 may, for example, be used to derive directions and orientations locally for how the hair should flow. One or more optional masks 204 may be used to limit the effect that other inputs 200 have on intermediate and final results. A mask 204 may be user-specified. For example, the user may draw the mask on paper and then scan the drawing to generate a digital image representation, or may create the mask 204 via a user interface of a drawing program or application to generate a digital image representation. Alternatively, a mask 204 may be automatically derived from other input 200, for example from a digital image representation of stroke(s) 202. As an example, a mask 204 may specify a region into which the directional texture element is to be synthesized to generate a directional texture element instance. One or more optional user maps 206 may be input and used to alter the behavior of one or more steps of the texture synthesis directional texture generation method. A user map 206 may specify a constraint for the directional texture element to be generated. Note that a mask 204 may be considered a special case of a user map 206.

In addition, the sample-based texture synthesis method may access one or more directional texture element samples 208, for example hair samples, from a library or collection of sample 208 images. This library may include photographs of hair and/or synthesized samples of hair, for example as produced, modified or synthesized by any of the directional texture generation methods described in this document. In some embodiments, in addition to the image itself, at least some samples 208 may have an associated descriptor that includes metadata describing one or more aspects or features of the sample.

While FIG. 8 shows stroke(s) 202, user maps 206 and other input 200 as image data such as pixel maps or bitmaps, various input 200 may be provided in functional, vectorial, or parametric form instead of or in addition to image data in various embodiments.

Texture Synthesis

Texture synthesis is a method that may be applied to fill a user defined region (such as one defined by an optional mask) with some content, where the content is either identical to, or structurally and visually similar to user defined or selected samples. In texture synthesis, the user generally does not care about the structural properties of the content of the synthesized region as long as the synthesized region looks believable, often judged by similarity to samples from the sample collection.

To use texture synthesis techniques to generate realistic looking, controllable directional texture content such as hair, embodiments may automatically guide the texture synthesis algorithm using user stroke(s) 202 and/or one or more optional maps 206.

Patch-Based Directional Texture Similarity and Directional Texture Transfer

In at least some embodiments of a sample-based texture synthesis directional texture generation method, given one or more sample images 208 of a directional texture element such as hair, a similarity map between input (e.g., stroke(s) 202) and one or more of the reference samples 208 may be generated. In some embodiments, a similarity map may be encoded, for example, as a nearest neighbor field (NNF). An example NNF technique that may be used in some embodiments may be described as follows. Given a patch size (N×M) of pixels (e.g., N=3 and M=5, or N=114), a target region, possibly defined by an optional mask 204, to be textured in a target image may be divided into patches. One or more of the patches may overlap, but do not necessarily overlap. One or more images from sample library 208 may also be divided into patches of the same size (N×M). In some embodiments, multiple patch-sizes may be used in an iterative coarse-to-fine approach, which may speed up or otherwise improve processing.

In some embodiments, each patch in the target region may be compared to each patch in the sample 208 library using a similarity measure. A patch in the library that best matches the target region patch may be identified as the nearest neighbor. The similarity measure may be any function that can compare target patch features to sample library patch features. Features may include one or more of, but are not limited to, color, orientation, brightness, edges, edge orientations, chromaticity, texture descriptors, or any other suitable image feature. The target patch features may be derived from the stroke(s) 202 and/or one or more optional user maps 206.

As the number of comparisons required for finding an optimal match grows exponentially with the number of patches to be compared, some embodiments may implement various optimizations to make the procedure tractable. One such method that may be used in some embodiments is to stop searching once a match is found with a similarity measure above a certain user-specified threshold. Thus, the matching patch may not be the globally best match. In some embodiments, features of patches may be quantized into vectors and stored in a data structure, such as a binary space partitioning (BSP) tree, Quad-tree, or k-dimensional (k-d) tree, to facilitate optimization via spatial and/or hierarchical data structures. In some embodiments, structural coherence properties of natural images (such as those containing hair samples) may be exploited to optimize search performance using a stochastic sampling technique. Some embodiments may apply a dimensionality reduction optimization technique to the patches. In some embodiments, the dimensionality reduction technique may be a feature extraction technique such as a principal component analysis (PCA) technique. As another example of an optimization technique, some embodiments may take advantage of the spatial neighborhood by growing existing patches, for example using a randomized patch matching algorithm as described in *PatchMatch: A Randomized Correspondence Algorithm for Structural Image Editing.* [ACM Transactions on Graphics, Barnes, C., Shechtman, E., Finkelstein, A. and Goldman, Dan B., Proc. *SIGGRAPH* 28(3), August 2009.]

In at least some embodiments, target patch features to be used in the matching process may be derived from any given input. For example, in some embodiments, orientations may be extracted and interpolated from the orientation stroke(s) 202. In some embodiments, lighting, shading, and color information may be derived from output of a procedural directional texture generation method, as discussed in relation to the procedural method described above.

In at least some embodiments, once the similarity map (e.g., nearest neighbor field (NNF)) has been established, for each patch location in the target region, a best-matching patch from the sample library 208 may be placed in the location of the target patch. In some embodiments, to achieve better local coherence, a list of possible best matches may be established. Given a partially filled target region, the best patch for an adjacent empty region may then be determined from the list of best matches by choosing the best match that also matches well with the existing neighbors. In some embodiments, placement of patches may be performed by warping the sample patch into the target patch location using a suitable affine or non-affine method, such as the affine and non-affine methods described in the section titled *Manipulating directional texture element primitives* for the image warping method. For example, a sample patch whose orientation matches a target patch orientation well, but not perfectly, may be warped according to the image warping method to best align the patch orientations.

In some embodiments, to avoid discontinuities along edges of the patches, adjacent patches may be overlapped, and the overlapped region may be appropriately blended or interpolated. Techniques for blending the overlapped regions that may be used in various embodiments include, but are not limited to, linear or higher order blending, gradient-domain blending, and patch quilting.

Applications

The synthesized results 220 may, for example, be overlaid on top of a photograph or other image to effectively render, for example, hair into that photograph or image, or may be used as input to any of the directional texture generation methods described herein. For example, the synthesized results 220 may be used as high-frequency lighting component for the procedural directional texture generation method, as illustrated in FIG. 5, or as a primitive for an image warping method. In addition, the synthesized results 220 may be stored as a sample 208 for the sample-based texture synthesis directional texture generation method.

Curve-Based Hair Similarity and Texture Transfer

Rather than looking for similarity of different patches, some embodiments may look at similarity of full parameterized curves within the hair style. In some embodiments, given a set of sample images 208, these curves may be automatically extracted from the image structure, or may be user-annotated. In some embodiments, given stroke(s) 202, a best matching sample stroke based on curve features (such as length, curvature, moments, or other suitable shape matching features) may be found. This approach may improve the performance of the similarity search since it only considers a sparse set of curves, rather than individual pixels. Additionally, this approach may ensure structural coherence along the matched curve, as all underlying image features may be derived from a single coherent source image.

In some embodiments, to construct the target region using this approach, for each target curve, the best matching sample curve may be selected and image features (such as color, brightness, chromaticity, etc.) around the sample stroke in the sample image(s) 208 may be copied and warped into the target region. In some embodiments, to implement this step, two decisions are made: how much information (sample image features) around each sample curve is to be copied, and how this information is to be applied and warped into the target region.

In some embodiments, the first decision may be informed, for example, by a distance transform around each curve. For example, all features between a curve and its neighboring curves may be copied. As alternatives that may be used in some embodiments, just the information up to the halfway point between two curves may be copied, or the information up to the point of a strong image feature (such as a strong edge) may be copied.

In various embodiments, the second decision may be implemented in various ways. For example, in some embodiments, the information around the sample stroke may be warped so that the sample stroke completely aligns with the target stroke. In some embodiments, the sample features may be adjusted to conform to existing target features (e.g. color matching). In some embodiments, abutting regions of neighboring target strokes may be interpolated or blended.

FIG. 9 is a flowchart of a flow-guided, sample-based texture synthesis directional texture generation method, according to some embodiments. A sample-based texture synthesis directional texture generation method may obtain one or more strokes, as indicated at 230. In addition, the method may obtain one or more optional masks and one or more optional user maps, as indicated at 230. Sample images, for example sample images of hair, that may be applied to the input may be obtained, for example from a library of sample images, as indicated at 232. A target region, which may be derived from stroke(s), defined by an optional mask, or otherwise specified or derived, and one or more sample images may be divided into patches, as indicated at 234. In some embodiments, sample images may have been previously divided into patches; that is, the sample library may already include information indicating patches in the sample image. A similarity map between input (e.g., stroke(s) and/or one or more optional user maps) and the reference sample images may be generated, as indicated at 236. To generate the similarity map, matching patches for the patches in the target region defined by the mask may be found in the sample image patches according to one more matching features. As indicated at 238, the patches in the target region may be replaced with the matching patches from the sample images to generate a synthesized result. For each location in the target region, a best-matching patch from the sample images may be placed in the location of the corresponding target patch. In some embodiments, replacing a patch in the target region with a corresponding patch from the sample images may involve applying an image warping technique to the patch from the sample images. In some embodiments, a blending or interpolation technique may be applied to the synthesized result.

FIG. 10 illustrates an example sample-based texture synthesis directional texture generation module that may implement a flow-guided, sample-based texture synthesis directional texture generation method as illustrated in FIGS. 8 and 9. FIG. 21 illustrates an example computer system on which embodiments of module 250 may be implemented. Module 250 may receive, as input, stroke(s) 202, one or more optional mask(s) 204, one or more optional user maps 206, and possibly other input. The input may be image data such as pixel maps or bitmaps, and/or may be provided in functional, vectorial, or parametric form. In some embodiments, module 250 may receive as input an input image, for example a digital photograph, from which one or more of stroke(s) 202, user maps 206, and mask(s) 204 may be automatically derived. In some embodiments, module 250 may provide a user interface 252 via which a user may interact with the module 250 to provide user input 254, for example settings for or adjustments to various parameters used by the sample-based texture synthesis directional texture generation method, file names or locations, thresholds, and so on.

Module 250 performs the sample-based texture synthesis directional texture generation method, for example as described in FIGS. 8 and 9, according to the input. For example, a patch generation 260 process may generate target region patches and sample patches. A patch matching 262 process may generate a similarity map by matching sample patches to target region patches according to one or more matching features. Features may include one or more of, but are not limited to, color, orientation, brightness, chromaticity, texture descriptors, or any other suitable image feature. A patch replacement 264 process may then replace patches in the target region with corresponding sample patches according to the similarity map. Module 250 generates, as output, synthesized result 220. Synthesized result 220 may, for example, be stored to a storage medium 286, such as system memory, a disk drive, DVD, CD, etc., and/or displayed to a display device 288. In at least some embodiments, synthesized result 220 may be used as input to another directional texture generation method. For example, synthesized result 220 may be used as a high-frequency component in a procedural directional texture generation method, as shown in FIG. 5. As another example, synthesized result 220 may be added as a sample in the texture synthesis directional texture generation method. As another example, synthesized result 220 may be used as input to an image warping directional texture generation method, for example as a primitive or as a target image.

FIG. 11 illustrates an example sample-based texture synthesis directional texture generation module using a procedural directional texture generation method as a pre-processing step. In some embodiments, to match sample patches to target region patches based on additional matching features such as color and brightness, instead of stroke(s) 202 and optional mask(s) 204 and maps 206 going directly into the texture synthesis directional texture generation module 250, at least stroke(s) 202 may be pre-processed according to a procedural directional texture generation method to generate intermediate result 240, which may then be processed according to the texture synthesis directional texture generation method to generate the synthesized result 220. The stroke(s) 202, optional mask(s) 204, and possibly one or more optional user maps 206 may be input to procedural directional texture generation module 180 to generate a procedural synthetic intermediate result 240. The intermediate result 240 is input to the texture synthesis directional texture generation module 250. Patches in the target region of intermediate result 240 may then be matched to sample 208 patches according to the additional matching features to generate a similarity map, and the patches in the target region of intermediate result 240 may then be replaced with the best-matching sample 208 patches according to the similarity map.

Image-Based Hair Design using Image Warping

Figure 12A:
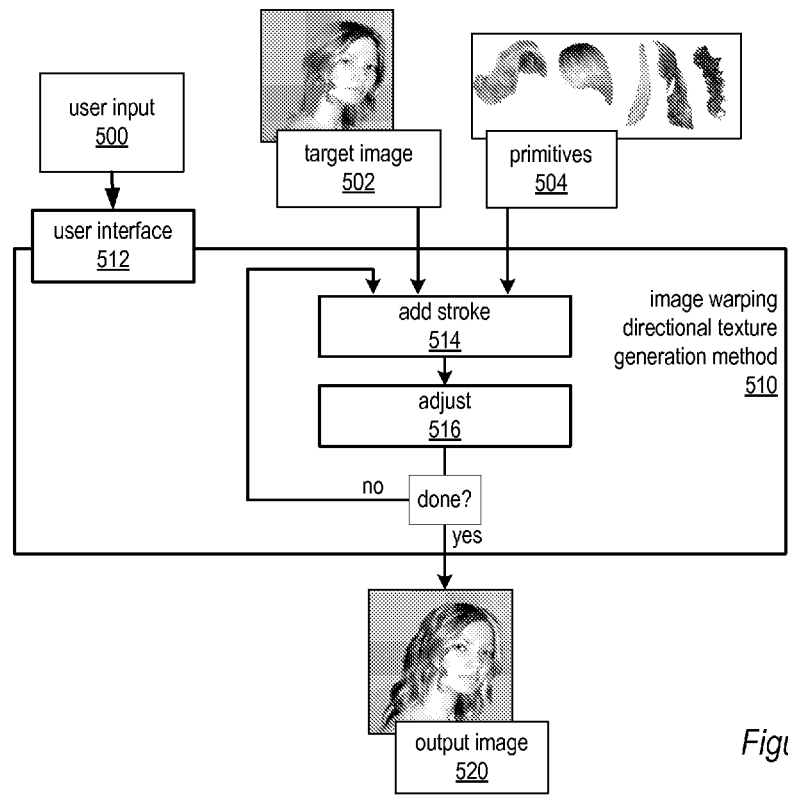
FIG. 12A a block diagram illustrating a workflow for an image warping directional texture generation method, according to some embodiments.
Figure 18:
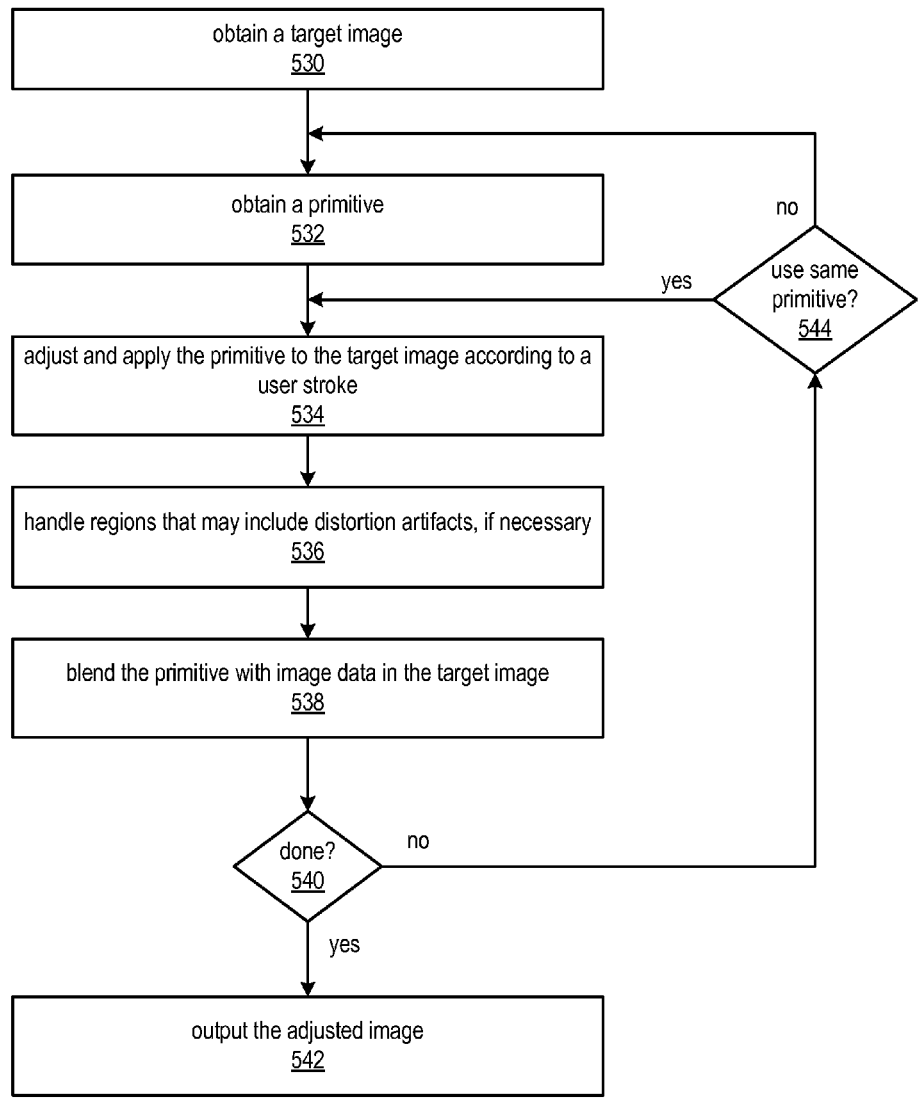
FIG. 18 is a flowchart of an image warping directional texture generation method, according to some embodiments.
Figure 19:
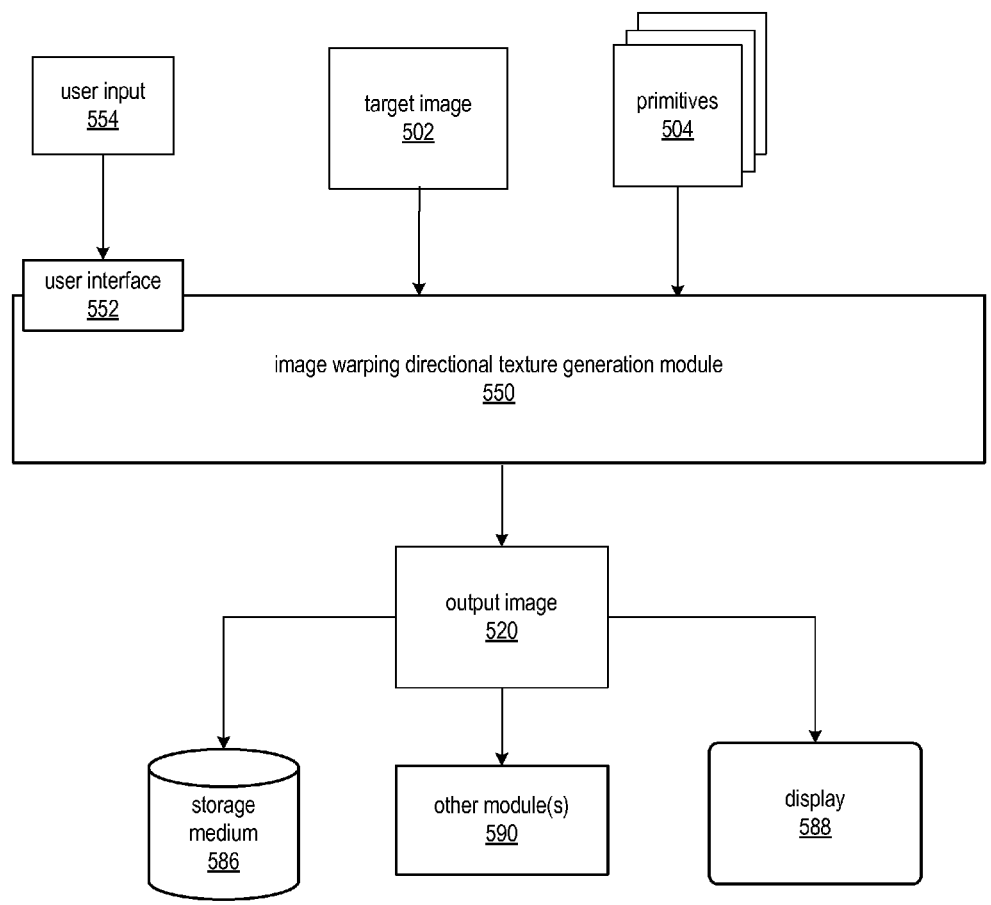
FIG. 19 illustrates an example image warping directional texture generation module that may implement an image warping directional texture generation method as illustrated in FIGS. 12 through 18.

FIG. 12A is a block diagram illustrating a workflow for an image warping directional texture generation method, according to some embodiments. The image warping directional texture generation method 510 may, for example, be used to design or modify hair or hairstyles. In this description, hair design and styling is used as an example; however, other directional texture elements may also be designed or modified using embodiments. FIG. 18 is a flowchart of an image warping directional texture generation method according to some embodiments. Embodiments of the image warping directional texture generation method may be performed by an image warping directional texture generation module implemented by program instructions stored in a computer-readable storage medium and executable by one or more processors (e.g., one or more CPUs or GPUs). Embodiments of an image warping directional texture generation module may, for example, be implemented as a stand-alone application, as a module of an application, as a plug-in for applications including image processing applications, and/or as a library function or functions that may be called by other applications such as image processing applications. Embodiments of the image warping directional texture generation module may be implemented in any image processing application, including but not limited to Adobe® PhotoShop® Adobe® PhotoShop® Elements®, Adobe® After Effects®, Adobe® Illustrator®, and Adobe® Flash®. An example image warping directional texture generation module is illustrated in FIG. 19. An image warping directional texture generation module may be implemented as a stand-alone module or as a submodule of a directional texture generation module that implements one or more other types of directional texture generation methods, as illustrated in FIG. 20. An example computer system that may implement embodiments of an image warping directional texture generation module is illustrated in FIG. 21.

Figure 13:
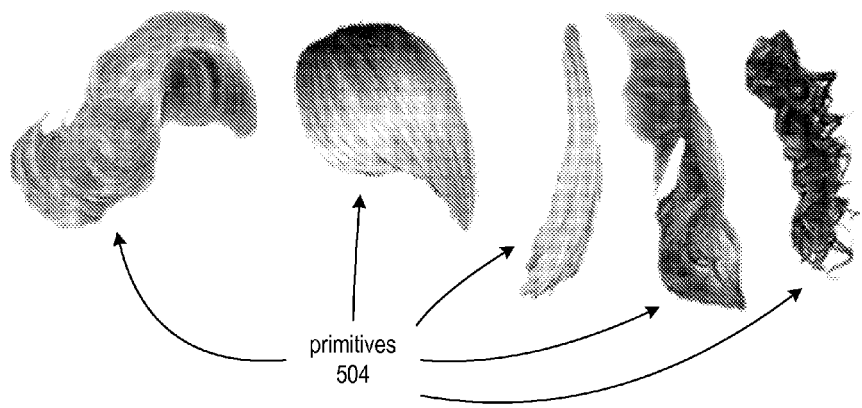
FIG. 13 shows examples of hair primitives, according to some embodiments.

Referring to FIG. 12A, in embodiments of the image warping directional texture generation method 510, instead of providing high-level guidance to a procedural method or a texture synthesis method via one or more strokes as described above, a user may exert more direct control over the final result by applying one or more strokes 514 with a provided brush or other user interface 512 element to paint the directional texture, such as hair, onto a target image 502. Each stroke 514 indicates an intended direction of flow for the currently selected primitive on the target image. As it may be cumbersome and time-consuming to draw individual atomic texture elements such as individual hair fibers, in at least some embodiments, image warping directional texture generation method 510 instead uses primitives 504 that contain multiple atomic texture elements, such as multiple hair fibers, strands, wisps, partings, etc., to paint the directional texture. In at least some embodiments, a primitive 504 may be a higher-level, hierarchical primitive containing two or more other directional texture element primitives. FIG. 13 shows some example primitives 504 that may be used in embodiments. After the user applies a stroke 514 to paint a primitive 504 or a portion of a primitive 504 onto the target image 502, the stroke 514 may be automatically adjusted at 516. The user may continue to apply strokes 514 until satisfied with the result.

Figure 12B:
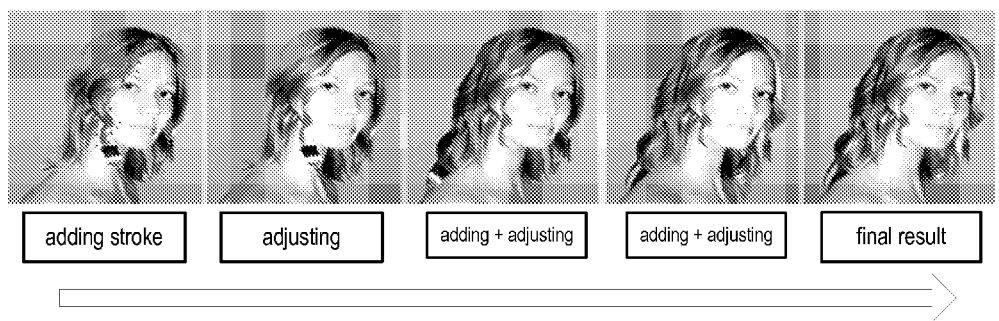
FIG. 12B shows an example user session to paint hair with image samples according to some embodiments of the image warping directional texture generation method.

FIG. 12B shows an example user session to paint hair with hair primitives according to some embodiments of the image warping directional texture generation method 510. The user layers strands of hair, e.g. primitives 504, on top of one another by drawing strokes, via user interface 512, over the drawing canvas (e.g., target image 502). Each stroke adds a parameterized hair primitive 504 along the user-specified stroke. In some embodiments, the hair primitive 504 may be automatically adjusted to blend into the existing hair (including previously applied strokes, if any). In some embodiments, this automatic adjustment may be performed by matching properties, such as color, shininess, or highlights of the drawn stroke. In some embodiments, to match colors, histogram matching between the source hair (the primitive 504) and the target hair (the target image 502) may be performed. In some embodiments, to match shininess or highlights, approaches such as those discussed for the procedural directional texture generation method may be employed. In various embodiments, various other suitable techniques may be used to match colors, shininess, highlights, etc.

In at least some embodiments, a record of each stroke applied to the target image 502 may be maintained to allow the user to go back and adjust or undo one or more previously applied strokes.

Hair Primitives

FIG. 13 shows examples of hair primitives 504 according to some embodiments, and is not intended to be limiting. Primitives 504 that may be used in embodiments of the image warping directional texture generation method 510 may be of varied nature. For example, hair primitives 504 may include long thin strands and/or large pieces of a complete hairdo. To allow the user a diverse selection of primitives 504 to choose from, a library of hair primitives 504 that may be used in embodiments may include primitives that exhibit one or more of, but not limited to, various characteristics of hair (e.g., curly/straight/wavy; short/long/shorn; shiny/dull; etc.) and various hair elements (e.g., strands/locks/partings/roots/tips; entire hairdos or hairstyles/single strands/multiple strands/thin wisps; etc.) In at least some embodiments, given a suitable data representation, the primitives may be parameterized, such that color, shape, hair fiber thickness, etc. may be specified or manipulated by the user independently to allow for precise selection and control over the primitives.

Acquisition of Primitives

In various embodiments, the primitives 504 in a collection, database or library of primitives may be acquired in various ways. For example, primitives 504 may be manually or automatically masked out of a collection of photographs, or may be synthesized by any of the directional texture generation methods described herein. In various embodiments, primitives 504 may be synthesized via a procedural directional texture generation method, may be synthesized via a sample-based texture synthesis directional texture generation method, and/or may be synthesized via the image warping directional texture generation method.

Selecting Primitives

In some embodiments, the user interface 512 may display thumbnail images representing the primitives 504; the user may then search through the primitives 504 to find a desired primitive 504. However, depending on the size of the library of primitives 504, it may be time consuming to find the right primitive 504. Some embodiments may provide a sketching interface that may be used to locate and extract desired primitives 504. Using the sketching interface, the user may draw one or more curves that may be used to locate a primitive 504 that best matches the drawn curves. In some embodiments, a curve similarity measure, for example as described in relation to the texture synthesis directional texture generation method, may be used to measure similarity between curves.

Alternatively, in some embodiments, the library of primitives 504 may be organized by the characteristics of the primitives 504 (e.g., hair primitives) contained within it. In some embodiments, each primitive 504 may have an associated descriptor that includes metadata describing one or more characteristics or properties of the primitive 504. The characteristics or properties may be exposed to the user, for example via a structured menu, a search interface, a faceted-search interface, or via some other user interface element or elements. The user may then locate and select primitives 504 based on one or more desired characteristics or properties via the provided user interface.

Parameterization of Primitives

In some embodiments, each primitive 504 may include, but is not limited to, metadata describing the image content. Each primitive 504 may have an associated descriptor that includes the metadata describing one or more characteristics or properties of the primitive 504. In some embodiments, each primitive 504 may include one or more properties that may be described in the metadata, which may include but are not limited to: an alpha-mask, which may for example be used to blend the primitive 504 with an existing background; geometric markup, such as a major axis (in the case of elongated strands) and/or curvature; specific information, such as base color, highlight color, etc. for hair; and sub-primitives (e.g., several primitives may be combined to form new primitives).

In some embodiments, one or more properties of a primitive 504 may be adjusted by the user via one or more user interface elements provided by user interface 512. In some embodiments, one or more properties of a primitive 504 may be adjusted automatically. For example, in some embodiments, as the user draws a primitive 504 over a target image 502, the color of the primitive 504 may be adjusted automatically to match or blend with the underlying image 502 data.

Manipulating Directional Texture Element Primitives

In various embodiments, primitives 504 may be applied to a target image 502 and manipulated in a various ways. In some embodiments, primitives 504 may be applied according to affine transformations. In various embodiments, these affine transformations may be rotated, translated, scaled, and/or sheared in the target image 502. In some embodiments, primitives 504 may be applied according to non-affine transformations. In some embodiments, these non-affine transformations may be manipulated by a generalized warp:

$$R(x, y) = \sum_i w_i \cdot S(f_i(x, y))$$

where R represents the result image, S represents the source image, (x,y) represents an image coordinate, $f_i:R^2 \to R^2$ represents a family of functions that map one coordinate to a (possibly different) coordinate, $w_i$ are weights, and i iterates over possibly all pixels in the source image.

Figure 14:
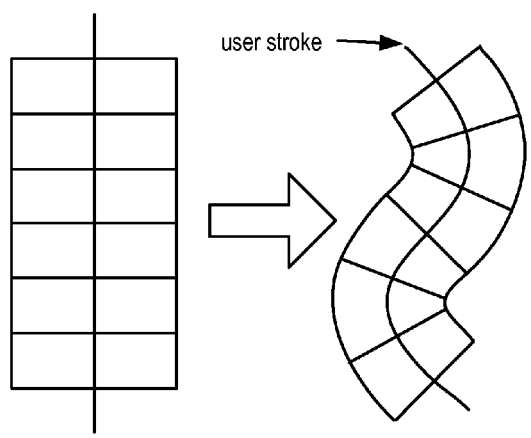
FIG. 14 illustrates parameterizing a primitive on a grid and distorting the primitive using the grid, according to some embodiments.

In some embodiments, a primitive 504 may be parameterized on a grid or mesh, as shown in FIG. 14, and then distorted. Various meshes or grids may be employed in various embodiments, such as quadrilateral grids, triangular grids, regular grids, irregular meshes, etc. In general, any surface parameterization that allows for uniquely specifying positions in the source image and remapping these positions to similar or new positions in the target image may be employed. In some embodiments, the distortion may be guided by a user stroke, as indicated in FIG. 14. In various embodiments, the distortion may be guided by or performed by various other suitable methods. For example, in various embodiments, the distortion may be guided by manipulation of one or more of the mesh's vertices, or by manipulation of one or more parametric curves describing the mesh.

Figure 15:
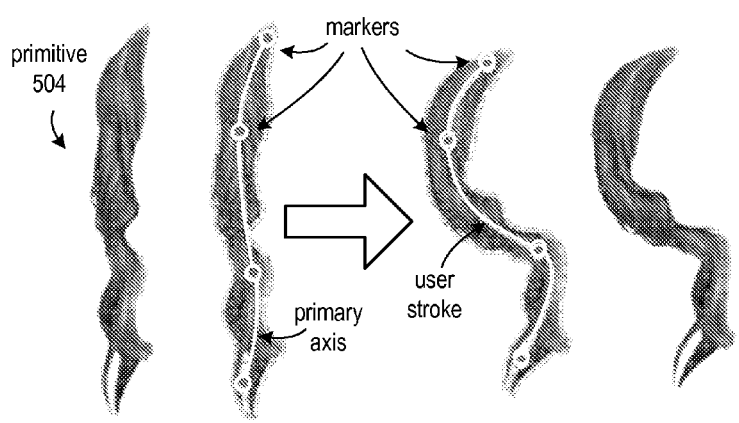
FIG. 15 illustrates a method of deformation that may be used in some embodiments.

FIG. 15 illustrates a method of deformation that may be used in some embodiments. This method employs a least-squares deformation, whereby a grid is deformed in such a way that corresponding points or markers on a primary axis of the primitive 504 (represented by white circles in FIG. 15) are moved to new positions according to the user stroke, while minimizing the stretching of mesh edges in the remaining mesh. In some embodiments, instead of placing the correspondence markers manually, the markers may be computed automatically from a user stroke and aligned with the primary axis of the primitive 504, thus allowing the primitive 504 to be aligned with the user stroke. In at least some embodiments, principal axes of primitives may be automatically derived by employing suitable skeletonization, thinning, or morphological operations.

Dealing with Distortion Artifacts

Figure 16:
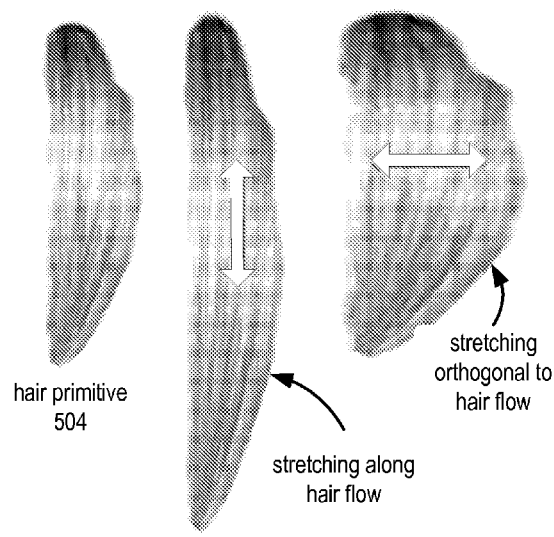
FIG. 16 illustrates distorting a primitive along the direction of flow and in a direction orthogonal to flow, according to some embodiments.

FIG. 16 illustrates distorting a primitive by stretching the primitive, shown on the left, along the direction of flow and in a direction orthogonal to flow, according to some embodiments. When distorting images of hair primitives 504, due to the fine structure of a directional texture element such as hair, the distortion (e.g., stretch) may lead to noticeable artifacts. Distortions, such as stretching, along the direction of flow generally produce less visible artifacts than distortions orthogonal to the flow.

Some embodiments may address stretching artifacts by identifying regions in the deformation mesh that are stretched beyond at least one user-specified distortion threshold. In some embodiments, the user may specify a distortion threshold for stretching along the flow and a separate distortion threshold for stretching across the flow. Alternatively, in some embodiments, an algorithm may automatically correlate the two dimensions based on a single user-defined threshold.

Figure 17:
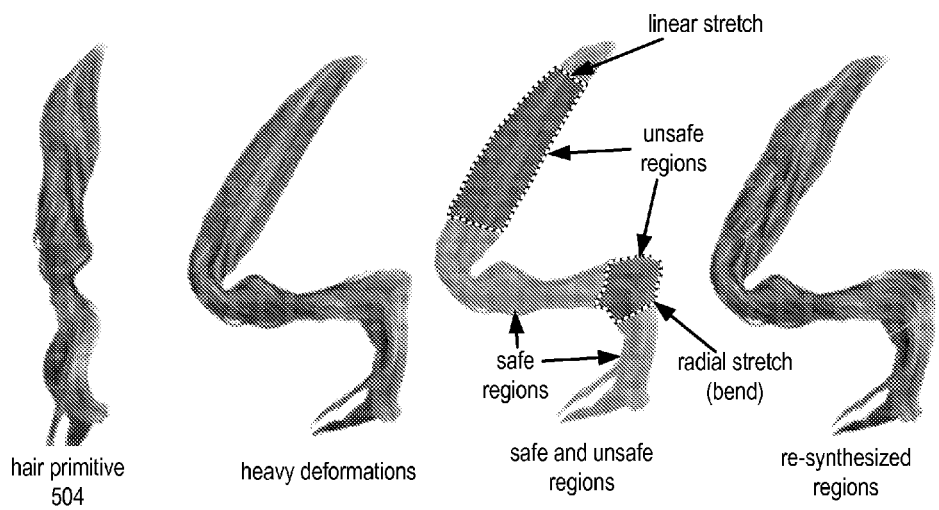
FIG. 17 illustrates distorting a primitive and handling resulting artifacts according to some embodiments.

FIG. 17 illustrates distorting a primitive and handling resulting artifacts according to some embodiments. A stroke is applied that heavily distorts a primitive 504, as shown in the second image of FIG. 17. In the third image of FIG. 17, regions that have been distorted above at least one distortion threshold are indicated by the black and white dotted lines; the areas inside the dotted lines may be referred to as unsafe regions. The rest of the primitive in the third image of FIG. 17 are considered safe regions. While no special treatment may be necessary for the safe regions, some embodiments may replace unsafe regions with less distorted directional texture (e.g., hair). This may be performed in various ways in various embodiments. For example, in some embodiments, an unsafe region may be re-synthesized using a flow-guided texture synthesis method, as previously described. Alternatively, in some embodiments, the original image data contained in the unsafe region may be artificially extended, or shrunk, using a content-aware scaling approach, such as seam carving or content-aware fill. In any case, the source material to fill the unsafe region may come from one or more of the unsafe region itself, the union of safe and unsafe regions of the same primitive 504, and the library of primitives 504. In the latter case, in some embodiments, the parameters of the primitive(s) 504 selected from the library may be adjusted before applying the source material from the primitive(s) 504 to fill the unsafe region (e.g., colors may be matched).

In some embodiments, to limit artifacts at the boundary between safe regions and unsafe regions, a border region around the transition boundary may be appropriately blended or interpolated. Approaches that may be used in various embodiments may include, but are not limited to, linear or higher order blending, gradient-domain blending, and patch quilting.

Applications

An output image 520 may be used in any of the directional texture generation methods described herein. For example, output image 520 may be used as an input image to the procedural directional texture generation method or the sample-based texture synthesis directional texture generation method, or stored as a sample 208 for the sample-based texture synthesis directional texture generation method.

FIG. 18 is a flowchart of an image warping directional texture generation method, according to some embodiments. A target image may be obtained, as indicated at 530. The target image may, for example, be a digital photograph or synthesized image, or may be an output image of any of the directional texture generation methods described herein. A primitive may be obtained, as indicated at 532. For example, a primitive may be selected from a library of primitives via one of one or more user interface methods. As indicated at 534, the selected primitive may be adjusted and applied to the target image, for example according to a stroke applied by the user via the user interface. For example, the primitive may be applied as a "painted" stroke using a brush or similar user interface element. The selected primitive may be automatically adjusted according to the stroke. For example, in some embodiments, a grid representing the selected primitive may be generated, and the grid may be distorted according to the direction of flow indicated by the stroke. The adjusted primitive may be appropriately blended with image data in the target image In adjusting the primitive, the primitive may be distorted; for example, the primitive may be bent or stretched, which may result in distortion artifacts. As indicated at 536, regions of the adjusted primitive that may include distortion artifacts, if any, may be automatically processed to remove or reduce distortion artifacts. For example, in some embodiments, unsafe regions may be identified using one or more user-specified distortion thresholds. Content of the unsafe regions may then be re-synthesized. For example, in some embodiments, an unsafe region may be re-synthesized using a flow-guided texture synthesis approach, as previously described. Alternatively, in some embodiments, the original image data contained in the unsafe region may be artificially extended, or shrunk, using a content-aware scaling approach, such as seam carving. In any case, the source material to fill the unsafe region may come from one or more of the unsafe region itself, the union of safe and unsafe regions of the same primitive, and a library of primitives. In the latter case, in some embodiments, the parameters of the sample taken from the library may be adjusted before applying it to fill the unsafe region (e.g., colors may be matched). As indicated at 538, the painted primitive may be appropriately blended with image data in the target image.

At 540, if the user is done, then the modified target image is output as output image 520. At 540, if the user is not done, then the method may allow the user to apply more strokes. At 542, if the user wants to use the same primitive to paint an additional stroke, the method returns to 534. Otherwise, the method returns to 532 to obtain a different primitive.

FIG. 19 illustrates an example image warping directional texture generation module that may implement an image warping directional texture generation method as illustrated in FIGS. 12 through 18. FIG. 21 illustrates an example computer system on which embodiments of module 550 may be implemented. Module 550 may obtain a target image 502 and one or more primitives 504, for example from a library of primitives. The target image 502 may, for example, be a digital photograph or synthesized image, or may be an output image of any of the directional texture generation methods described herein. Module 550 performs the image warping directional texture generation method, for example as described in FIGS. 12 through 18, according to user input 554 to user interface 552. Module 550 generates, as output, an output image 520 representing the target image 502 as modified by one or more user strokes that applied one or more primitives 504 to the target image 502 as described for FIGS. 12 through 18. Output image 520 may, for example, be stored to a storage medium 586, such as system memory, a disk drive, DVD, CD, etc., and/or displayed to a display device 588. In at least some embodiments, output image 520 may be used as input to another directional texture generation method. For example, output image 520 may be used as an input image to the procedural directional texture generation method or the sample-based texture synthesis directional texture generation method, stored as a sample 208 for the sample-based texture synthesis directional texture generation method, or stored as one or more primitives 504 for the image warping directional texture generation method.

Example Implementation of the Directional Texture Generation Methods

FIG. 20 illustrates an example directional texture generation module that may implement one or more of the directional texture generation methods illustrated in FIGS. 1 through 19. Module 900 may, for example, implement one or more of a procedural directional texture generation method 902, a sample-based texture synthesis directional texture generation method 904, and an image warping directional texture generation method 906. FIG. 21 illustrates an example computer system on which embodiments of directional texture generation module 900 may be implemented. According to the various directional texture generation methods, module 900 may receive, as input, one or more strokes 912, one or more optional user maps 914, one or more optional masks 916, samples 918, and/or primitives 920, and possibly other input. In some embodiment, module 900 may also receive user input 910 specifying one or more strokes 912. Module 900 may also receive other user input 910, for example user input to "paint" hair from a sample or primitive onto an image, to stretch or otherwise modify portions of the hair, to select hair samples or primitives, to apply or modify color, and so on. In some embodiments, module 900 may receive as input an input image 930 to be manipulated, for example a digital photograph. In some embodiments, one or more of user strokes 912, optional user maps 914, and optional masks 916 may be automatically generated from an input image 930 by module 900.

Module 900 performs various directional texture generation operations according to the input and according to the particular directional texture generation method being used. The user may select a different directional texture generation method and further edit the image, and/or may activate other tools and further edit the image. Module 900 generates as output one or more output images 950. Output image(s) 950 may, for example, be stored to a storage medium 960, such as system memory, a disk drive, DVD, CD, etc., and/or displayed to a display device 970. In some embodiments, output from one directional texture generation method may be used as input to the same method or to another directional texture generation method. For example, output from any of the directional texture generation methods may be used as a sample 918 or as a primitive 920.

In some embodiments, directional texture generation module 900 may provide a user interface 922 via which a user may interact with the module 900, for example to perform, control, or provide input to the various directional texture generation methods as described herein. For example, in some embodiments, the user interface may provide user interface elements whereby the user may select or specify various options or parameters including, but not limited to, user-specified threshold(s) for stretching, or other parameters to be used in the various directional texture generation methods.

Example System

Embodiments of the directional texture generation methods or modules as illustrated in FIGS. 1 through 20 may be executed on one or more computer systems, which may interact with various other devices. One such computer system is illustrated by FIG. 21 by way of example. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described for embodiments of the directional texture generation methods or modules as described herein, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 21, memory 1020 may include program instructions 1025, configured to implement embodiments of the directional texture generation methods or modules as described herein, and data storage 1035, comprising various data accessible by program instructions 1025. In one embodiment, program instructions 1025 may include software elements of embodiments of the directional texture generation methods or modules as described herein. Data storage 1035 may include data that may be used in embodiments. In other embodiments, other or different software elements and data may be included.

Those skilled in the art will appreciate that computer system 1000 is merely illustrative and is not intended to limit the scope of the directional texture generation methods or modules as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   obtaining input selecting one of a plurality of directional texture element primitives, a directional texture element comprising a texture that has a directional flow characteristic, and the plurality of directional texture element primitives including images of real examples of directional texture elements;
   obtaining a stroke adding the selected primitive to a target image, the stroke indicating a location in the target image and an intended direction of flow for the selected primitive in the target image;
   automatically adjusting the selected primitive according to the stroke; and
   applying the adjusted selected primitive to the indicated location of the target image.

2. The method as recited in claim 1, wherein the directional texture element is hair, and wherein the plurality of directional texture element primitives are hair primitives.

3. The method as recited in claim 1, wherein the plurality of directional texture element primitives further include synthesized examples of the directional texture element.

4. The method as recited in claim 1, wherein each directional texture element primitive in the plurality of directional texture element primitives comprises multiple atomic texture elements or two or more other directional texture element primitives.

5. The method as recited in claim 1, further comprising applying a blending technique to at least a portion of the target image to blend the adjusted selected primitive with image data in the target image.

6. The method as recited in claim 1, wherein said automatically adjusting the selected primitive according to the stroke comprises:
   generating a grid representing the selected primitive; and
   distorting the grid according to the direction of flow indicated by the stroke.

7. The method as recited in claim 1, wherein said automatically adjusting the selected primitive according to the stroke comprises:
   obtaining two or more markers along a primary axis of the selected primitive;
   obtaining two or more corresponding markers along the stroke; and
   deforming the primary axis of the selected primitive so that the two or more markers along the primary axis align with corresponding markers along the stroke.

8. The method as recited in claim 1, further comprising stretching the selected primitive in at least one direction prior to said applying.

9. The method as recited in claim 1, further comprising:
   identifying one or more regions of the adjusted selected primitive that include distortion artifacts; and
   replacing at least some content of the identified one or more regions with directional texture content that does not include distortion artifacts.

10. The method as recited in claim 9, wherein said identifying one or more regions of the adjusted selected primitive that include distortion artifacts comprises determining that the one or more regions have been adjusted beyond at least one distortion threshold.

11. A system, comprising:
    at least one processor; and
    a memory comprising program instructions, wherein the program instructions are executable by the at least one processor to:
       obtain input selecting one of a plurality of directional texture element primitives, a directional texture element comprising a texture that has a directional flow characteristic, and the plurality of directional texture element primitives including images of real examples of directional texture elements;
       obtain a stroke adding the selected primitive to a target image, the stroke indicating a location in the target image and an intended direction of flow for the selected primitive in the target image;
       automatically adjust the selected primitive according to the stroke; and
       apply the adjusted selected primitive to the indicated location of the target image.

12. The system as recited in claim 11, wherein the directional texture element is hair, and wherein each directional texture element primitive in the plurality of directional texture element primitives comprises multiple hairs or two or more other directional texture element primitives.

13. The system as recited in claim 11, wherein, to automatically adjust the selected primitive according to the stroke, the program instructions are executable by the at least one processor to:
    generate a grid representing the selected primitive; and
    distort the grid according to the direction of flow indicated by the stroke.

14. The system as recited in claim 11, wherein, to automatically adjust the selected primitive according to the stroke, the program instructions are executable by the at least one processor to:
    obtain two or more markers along a primary axis of the selected primitive;
    obtain two or more corresponding markers along the stroke; and
    deform the primary axis of the selected primitive so that the two or more markers along the primary axis align with corresponding markers along the stroke.

15. The system as recited in claim 11, wherein the program instructions are executable by the at least one processor to:
    identify one or more regions of the adjusted selected primitive that include distortion artifacts; and
    replace at least some content of the identified one or more regions with directional texture content that does not include distortion artifacts.

16. A computer-readable storage device comprising program instructions stored thereon that, responsive to execution, perform operations comprising:
    obtaining input selecting one of a plurality of directional texture element primitives, a directional texture element comprising a texture that has a directional flow characteristic, and the plurality of directional texture element primitives including images of real examples of directional texture elements;

obtaining a stroke adding the selected primitive to a target image, the stroke indicating a location in the target image and an intended direction of flow for the selected primitive in the target image;

automatically adjusting the selected primitive according to the stroke; and applying the adjusted selected primitive to the indicated location of the target image.

17. The computer-readable storage device as recited in claim 16, wherein the directional texture element is hair, and wherein each directional texture element primitive in the plurality of directional texture element primitives comprises multiple hairs or two or more other directional texture element primitives.

18. The computer-readable storage device as recited in claim 16, wherein, in said automatically adjusting the selected primitive according to the stroke further comprises:

generating a grid representing the selected primitive; and distorting the grid according to the direction of flow indicated by the stroke.

19. The computer-readable storage device as recited in claim 16, wherein, in said automatically adjusting the selected primitive according to the stroke further comprises:

obtaining two or more markers along a primary axis of the selected primitive;

obtaining two or more corresponding markers along the stroke; and deforming the primary axis of the selected primitive so that the two or more markers along the primary axis align with corresponding markers along the stroke.

20. The computer-readable storage device as recited in claim 16, wherein said automatically adjusting the selected primitive according to the stroke further comprises:

identifying one or more regions of the adjusted selected primitive that include distortion artifacts; and replacing at least some content of the identified one or more regions with directional texture content that does not include distortion artifacts.

\* \* \* \* \*